US011981472B2

(12) United States Patent
Chudy

(10) Patent No.: US 11,981,472 B2
(45) Date of Patent: *May 14, 2024

(54) PLURAL-MODE AUTOMATIC MEDICAMENT PACKAGING SYSTEM

(71) Applicant: CHUDY GROUP, LLC, Powers Lake, WI (US)

(72) Inventor: Duane S. Chudy, Lincolnshire, IL (US)

(73) Assignee: CHUDY GROUP, LLC, Powers Lake, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,294

(22) Filed: Dec. 28, 2022

(65) Prior Publication Data

US 2023/0136271 A1 May 4, 2023

Related U.S. Application Data

(63) Continuation of application No. 17/338,790, filed on Jun. 4, 2021, now Pat. No. 11,542,054, which is a (Continued)

(51) Int. Cl.
*B65B 65/00* (2006.01)
*A61J 1/03* (2023.01)
(Continued)

(52) U.S. Cl.
CPC ............. *B65B 65/006* (2013.01); *A61J 1/035* (2013.01); *B65B 1/04* (2013.01); *B65B 5/067* (2013.01);
(Continued)

(58) Field of Classification Search
CPC .... B65B 1/04; B65B 1/06; B65B 1/10; B65B 1/30; B65B 5/04; B65B 5/045;
(Continued)

(56) References Cited

U.S. PATENT DOCUMENTS 2,655,259 A 10/1953 Francis
2,674,027 A 4/1954 Kosinski
(Continued)

FOREIGN PATENT DOCUMENTS

CA F2609055 12/2006
CA 2628789 8/2009
(Continued)

OTHER PUBLICATIONS

"Bastian Material Handling, LLC, Indianapolis, Indiana. www.bastiansolutions.com. Controls and Automation Interfaces. Date: Copyright 2006."
(Continued)

*Primary Examiner* — Dariush Seif
(74) *Attorney, Agent, or Firm* — Myers Bigel, P.A.

(57) ABSTRACT

A plural-mode automatic medicament packaging system. In embodiments, the system may include an automatic dispensing machine including an automatic medicament dispensing unit and may further include pouch packaging and blister package packaging units. The medicament dispensing unit may include one or more storage and dispensing units which store and dispense medicaments. Medicaments output from the medicament dispensing unit may be packaged in a pouch package by the pouch packaging unit. Alternatively, a diverter may direct medicaments output from the medicament dispensing unit to the pouch package packaging unit for packaging in a blister package. A single automatic medicament packaging system can package medicaments in different types of packaging providing a pharmacy with the opportunity to package medicaments in the form of packaging most appropriate to meet patient needs.

20 Claims, 30 Drawing Sheets

Related U.S. Application Data continuation of application No. 16/571,368, filed on Sep. 16, 2019, now Pat. No. 11,027,872, which is a continuation of application No. 15/243,613, filed on Aug. 22, 2016, now Pat. No. 10,427,819.

(60) Provisional application No. 62/209,659, filed on Aug. 25, 2015.

(51) Int. Cl.

| | |
|---|---|
| ***B65B 1/04*** | (2006.01) |
| ***B65B 5/06*** | (2006.01) |
| ***B65B 5/10*** | (2006.01) |
| ***B65B 7/16*** | (2006.01) |
| ***B65B 11/52*** | (2006.01) |
| ***B65B 35/10*** | (2006.01) |
| ***B65B 35/34*** | (2006.01) |
| ***B65B 43/42*** | (2006.01) |
| ***B65D 75/32*** | (2006.01) |

(52) U.S. Cl.

CPC ................ *B65B 5/103* (2013.01); *B65B 7/16* (2013.01); *B65B 11/52* (2013.01); *B65B 35/10* (2013.01); *B65B 35/34* (2013.01); *B65B 43/42* (2013.01); *B65D 75/327* (2013.01); *B65B 2210/02* (2013.01); *B65B 2220/14* (2013.01)

(58) Field of Classification Search

CPC ......... B65B 5/067; B65B 5/103; B65B 35/10; B65B 35/34; B65B 2210/02; B65B 2220/14; B65B 11/52; B65B 65/006; B65B 5/10; B65B 5/101; B65B 7/16; B65B 9/06; B65B 43/123; B65B 43/42; B65B 51/10; B65B 57/04; B65B 57/10; B65B 57/14; B65B 57/20; B65B 39/007; B65B 2039/009; B65B 61/26; B65D 75/327; A61J 1/035

USPC .... 53/128.1, 167, 500, 52, 53, 54, 494, 501, 53/64, 65, 131.2

See application file for complete search history.

(56) References Cited

U.S. PATENT DOCUMENTS

| | | | | |
|---|---|---|---|---|
| 3,323,208 | A | 6/1967 | Hurley | |
| 3,650,445 | A | 3/1972 | Heitzman | |
| 3,796,146 | A | 3/1974 | Lacey | |
| 3,815,802 | A | 6/1974 | Stevens | |
| 4,173,826 | A | 11/1979 | Heinrich et al. | |
| 4,179,806 | A | 12/1979 | Lieptz | |
| 4,199,863 | A | 4/1980 | Deckert | |
| 4,330,936 | A | 5/1982 | Swarth | |
| 4,409,843 | A | 10/1983 | Urban et al. | |
| 4,422,553 | A | 12/1983 | Hoeks et al. | |
| 4,473,192 | A | 9/1984 | Urban et al. | |
| 4,677,808 | A * | 7/1987 | Chenevard ................ | B65B 5/12 53/238 |
| 4,697,344 | A | 10/1987 | Leopoldi | |
| 4,763,810 | A | 8/1988 | Christiansen | |
| 4,815,210 | A | 3/1989 | Burrage | |
| 4,824,000 | A | 4/1989 | Baxter et al. | |
| 4,832,180 | A * | 5/1989 | Ferrero ................ | B65G 47/918 294/87.1 |
| 4,887,755 | A | 12/1989 | Gibilisco | |
| D305,960 | S | 2/1990 | Wolff | |
| 4,903,877 | A | 2/1990 | Hnatuk | |
| D310,731 | S | 9/1990 | Lieptz | |
| 4,953,745 | A | 9/1990 | Rowlett | |
| 4,964,555 | A | 10/1990 | Hnatuk | |
| 5,010,796 | A | 4/1991 | Mendenhall | |
| 5,038,475 | A | 8/1991 | Wolff | |
| 5,118,021 | A | 6/1992 | Fiocchi | |
| 5,208,762 | A | 5/1993 | Charhut et al. | |
| 5,238,121 | A | 8/1993 | Frisbie | |
| 5,337,919 | A | 8/1994 | Spaulding et al. | |
| 5,348,061 | A | 9/1994 | Riley et al. | |
| 5,417,359 | A | 5/1995 | Zellner | |
| 5,442,892 | A * | 8/1995 | Burns, III ............... | B65B 69/00 53/53 |
| 5,460,471 | A * | 10/1995 | Connor ............... | B65B 69/0058 414/811 |
| 5,481,855 | A * | 1/1996 | Yuyama ................. | B65B 5/103 53/493 |
| 5,502,944 | A | 4/1996 | Kraft et al. | |
| 5,597,995 | A | 1/1997 | Williams et al. | |
| 5,599,269 | A | 2/1997 | Detlinger | |
| 5,671,592 | A | 9/1997 | Yuyama et al. | |
| 5,678,393 | A | 10/1997 | Yuyama et al. | |
| 5,722,215 | A | 3/1998 | Yuyama | |
| 5,761,877 | A * | 6/1998 | Quandt ................... | G07F 11/70 53/238 |
| 5,765,606 | A | 6/1998 | Takemasa et al. | |
| 5,766,123 | A | 6/1998 | Detlinger | |
| 5,771,657 | A * | 6/1998 | Lasher .................... | B65B 61/20 53/493 |
| 5,839,257 | A | 11/1998 | Soderstrom et al. | |
| 5,852,911 | A | 12/1998 | Yuyama et al. | |
| 5,875,610 | A | 3/1999 | Yuyama et al. | |
| 5,944,243 | A | 8/1999 | Weinstein | |
| 6,011,999 | A | 1/2000 | Holmes | |
| 6,012,471 | A * | 1/2000 | Calvin ............... | B29D 11/0025 264/2.6 |
| 6,012,602 | A | 1/2000 | Yuyama et al. | |
| 6,021,392 | A | 2/2000 | Lester et al. | |
| 6,050,064 | A | 4/2000 | Yuyama et al. | |
| 6,073,799 | A | 6/2000 | Yuyama et al. | |
| 6,119,737 | A | 9/2000 | Yuyama et al. | |
| 6,122,895 | A * | 9/2000 | Schubert .................. | B25J 9/026 53/251 |
| 6,170,230 | B1 | 1/2001 | Chudy et al. | |
| 6,170,699 | B1 | 1/2001 | Kim | |
| 6,244,146 | B1 | 6/2001 | Arthur et al. | |
| 6,256,967 | B1 | 7/2001 | Hebron et al. | |
| 6,269,615 | B1 * | 8/2001 | Amborn .................. | B65B 35/44 53/235 |
| 6,330,351 | B1 | 12/2001 | Yasunaga | |
| 6,338,007 | B1 | 1/2002 | Broadfield et al. | |
| 6,349,848 | B1 | 2/2002 | Uema et al. | |
| 6,370,841 | B1 | 4/2002 | Chudy et al. | |
| 6,419,218 | B1 | 7/2002 | Hartsoe et al. | |
| RE37,829 | E | 9/2002 | Charhut et al. | |
| 6,449,927 | B2 | 9/2002 | Hebron et al. | |
| 6,457,611 | B1 | 10/2002 | Koehler | |
| 6,505,461 | B1 | 1/2003 | Yasunaga | |
| 6,581,356 | B2 | 6/2003 | Kim | |
| 6,625,952 | B1 * | 9/2003 | Chudy ................ | G07F 17/0092 221/129 |
| 6,658,322 | B1 | 12/2003 | Frederick et al. | |
| 6,690,998 | B1 | 2/2004 | Yuyama | |
| 6,702,146 | B2 | 3/2004 | Varis | |
| 6,705,487 | B2 | 3/2004 | Kim | |
| 6,742,671 | B2 | 6/2004 | Hebron et al. | |
| 6,925,774 | B2 | 8/2005 | Peterson | |
| 6,925,783 | B1 | 8/2005 | Pearson | |
| 6,975,922 | B2 | 12/2005 | Duncan et al. | |
| 7,177,721 | B2 | 2/2007 | Kirsch et al. | |
| 7,182,105 | B1 * | 2/2007 | Feehan ................. | G07F 11/165 141/2 |
| 7,185,476 | B1 | 3/2007 | Siegel et al. | |
| 7,228,988 | B2 | 6/2007 | Inamura | |
| 7,316,328 | B2 | 1/2008 | Yuyama et al. | |
| 7,334,379 | B1 | 2/2008 | Siegel et al. | |
| 7,430,841 | B2 * | 10/2008 | Seiffert ................... | B65B 9/045 53/247 |
| 7,472,526 | B2 | 1/2009 | Pearson | |
| 7,502,666 | B2 | 3/2009 | Siegel et al. | |
| 7,515,981 | B2 | 4/2009 | Ryznar et al. | |
| 7,516,848 | B1 | 4/2009 | Shakes et al. | |
| 7,537,155 | B2 | 5/2009 | Denenberg et al. | |

(56) References Cited

U.S. PATENT DOCUMENTS 7,540,222 B2 6/2009 Kim
7,587,878 B2 9/2009 Kim
7,647,745 B2 1/2010 Kames
7,661,249 B2 * 2/2010 Monti .................... B65B 5/12 53/238
7,721,512 B2 5/2010 Siegel et al.
7,784,244 B2 * 8/2010 Siegel .................... B65B 5/103 53/238
7,792,349 B2 9/2010 Van
7,796,799 B2 9/2010 Jorritsma
7,818,950 B1 10/2010 McGonagle et al.
7,848,846 B2 12/2010 Uema et al.
7,856,794 B2 12/2010 Zieher
7,882,680 B2 2/2011 Siegel et al.
7,886,506 B2 2/2011 Knoth et al.
7,922,037 B2 4/2011 Ohmura et al.
7,946,101 B1 5/2011 McGonagle et al.
7,971,414 B1 7/2011 McGonagle et al.
7,997,417 B2 8/2011 Saether
8,146,747 B2 4/2012 Luciano et al.
8,157,125 B2 4/2012 Schiff
8,225,582 B2 7/2012 Siegel et al.
8,261,939 B2 9/2012 Knoth
8,301,294 B1 10/2012 Shakes et al.
8,302,370 B1 11/2012 Decker et al.
8,380,346 B2 2/2013 Chudy et al.
8,516,781 B2 8/2013 Siegel et al.
8,831,773 B2 * 9/2014 Rosenbaum ........ G07F 11/1657 700/216
8,950,166 B2 2/2015 Feehan et al.
9,002,510 B2 4/2015 Chudy et al.
9,272,796 B1 3/2016 Chudy
9,311,451 B2 * 4/2016 Bae .................... B65B 35/44
9,355,221 B2 5/2016 Chudy et al.
9,355,222 B2 5/2016 Chudy et al.
9,387,148 B2 7/2016 Rosenbaum et al.
9,477,816 B2 10/2016 Dent et al.
9,489,492 B2 11/2016 Rosenbaum
9,610,219 B1 * 4/2017 Basso .................... B26F 1/40
9,672,327 B2 6/2017 Chudy et al.
9,779,216 B2 10/2017 Siegel et al.
2002/0014053 A1 2/2002 Kim
2002/0092275 A1 7/2002 Kim
2002/0104741 A1 8/2002 Buckley et al.
2002/0117030 A1 8/2002 Gambaro et al.
2002/0153056 A1 * 10/2002 Siegel .................... B65B 5/103 141/247
2003/0005800 A1 1/2003 Czarnek et al.
2003/0057231 A1 3/2003 Kim
2004/0088187 A1 5/2004 Chudy et al.
2004/0134043 A1 7/2004 Uema et al.
2005/0125097 A1 6/2005 Chudy et al.
2005/0145644 A1 7/2005 Mori et al.
2006/0021900 A1 2/2006 Feodoroff
2006/0086638 A1 4/2006 Priebe et al.
2006/0184271 A1 8/2006 Loveless
2006/0230710 A1 * 10/2006 Ishiwatari ............... B65B 61/26 53/493
2006/0277269 A1 12/2006 Dent et al.
2007/0011994 A1 * 1/2007 Wooldridge ............ B65B 57/20 53/506
2007/0186514 A1 * 8/2007 Vollm .................... G07F 11/54 53/247
2008/0282646 A1 * 11/2008 Gertitschke ............ B65B 57/06 53/244
2008/0314002 A1 12/2008 Yuyama et al.
2009/0014461 A1 1/2009 Omura et al.
2009/0120042 A1 5/2009 Wolfgang
2009/0152291 A1 6/2009 Ohmura et al.
2009/0184128 A1 * 7/2009 Kim .................... B65B 5/061 221/9
2009/0188937 A1 7/2009 Kim
2009/0210247 A1 8/2009 Chudy et al.
2010/0042255 A1 * 2/2010 Boutin .................... B65B 35/38 53/154
2010/0050570 A1 * 3/2010 Mori .................... B65B 9/093 53/154
2010/0077707 A1 * 4/2010 Kondo .................... B65B 5/103 53/493
2010/0168910 A1 * 7/2010 Haas .................... G07F 11/04 700/232
2011/0278318 A1 11/2011 Vandenhurk
2011/0278319 A1 * 11/2011 Knoth .................... B65B 5/103 235/494
2013/0018503 A1 * 1/2013 Carson ................ B65D 75/327 700/216
2013/0126545 A1 5/2013 Chudy et al.
2013/0158706 A1 6/2013 Chudy et al.
2013/0318931 A1 * 12/2013 Holmes .................. G07F 11/60 53/562
2013/0340391 A1 12/2013 Siegel et al.
2014/0230376 A1 8/2014 Knoth
2014/0261058 A1 * 9/2014 Henderson ........... A61G 12/001 105/199.1
2014/0261881 A1 9/2014 Chudy
2014/0261883 A1 9/2014 Dent et al.
2014/0371901 A1 12/2014 Rosenbaum
2015/0290084 A1 10/2015 Ho
2016/0027163 A1 * 1/2016 Bear .................... G06T 7/001 53/247
2016/0122045 A1 5/2016 Kames et al.
2016/0122060 A1 * 5/2016 Sweet .................... B65B 5/12 53/411
2016/0199260 A1 * 7/2016 Andersen, Sr. ......... B65B 57/06 53/235
2016/0304228 A1 * 10/2016 Hellenbrand ........... B65B 57/02
2017/0015445 A1 * 1/2017 Holmes ............... G07F 11/1657
2017/0017775 A1 1/2017 Dent et al.
2017/0057682 A1 * 3/2017 Chudy ................. B65B 65/006
2020/0010229 A1 * 1/2020 Chudy .................... B65B 5/103

FOREIGN PATENT DOCUMENTS

DE 102006007136 A1 12/2006
DE 102008047975 A1 4/2010
EP 1433457 A1 6/2004
EP 2093722 A1 8/2009
JP 2007209600 A 8/2007
JP 2007297066 A 11/2007
WO 2004088463 A2 10/2004
WO 2005017814 A1 2/2005
WO 2006128443 A1 12/2006
WO 2007091375 A1 8/2007
WO 2014159697 A1 10/2014

OTHER PUBLICATIONS

"Chudy Group LLC, Powers Lake, WI. ATP2. Date: Jul. 17, 2015."
"Chudy Group LLC, Powers Lake, WI. ATP—Series. Date: May 2013."
"Chudy Group, LLC, Powers Lake, WI. The ATP—Series Automated Tablet Packaging Solutions. Date: Jul. 2010."
"Dispill, Granby, Quebec, Canada. Dispill Prescription Packaging System. http://www.dispill.com/plateaux-a.html. Date: May 2014."
"Dispill, Granby, Quebec, Canada. Dispill Prescription Packaging System—product video excerpts. https://www.youtube.com/watch?v=-Drldf12rlc. Date: May 9, 2014."
"Fanuc America Corporation, Rochester Hills, Mi. Fanuc 2017 Robot Line-Up specification sheet. Date: Undated."
"Fanuc America Corporation, Rochester Hills, Mi. Fanuc M1iA Series 171 product brochure. Date: Copyright 2013."
"Innovation Associates, Johnson City, NY. PharmASSIST High Volume Solutions for Central Fill and Mail Order Large/Custom website excerpts. https://innovat.com/largecustom/. Date: Copyright 2018."
"Lighthouse Selection, LLC, Manchester, New Hampshire. Pioneering Order Fulfillment Technologies. www.lighthouseselection.com. Date: Copyright 2006."

(56) References Cited

OTHER PUBLICATIONS

"Medical Expo. Omnicell, Inc. MTS-350 Medicine Filling and Sealing Machine. www.medicalexpo.com. Date: 2017."
"Office Action corresponding to Canadian Application No. 2,939,591 dated Dec. 24, 2020".
"Office Action corresponding to Canadian Application No. 2,939,591 dated Feb. 13, 2020".
"Office Action corresponding to Canadian Application No. 2,939,591 dated Jul. 31, 2020".
"Omnicell, Inc., St. Petersburg, FL. MTS-350 Semi-Automated Filling and Sealing Machine. www.omnicell.com. Date: Copyright 2017."
"Omnicell, Inc., St. Petersburg, FL. Omnicell M5000—product video excerpts https://www.omnicell.com/mts/Products_and_Solutions_For_Pharmacy/Pharmacy_Automation_Systems/Omnicell_M5000.aspx. Date: Nov. 2014."
"Omnicell, Inc., St. Petersburg, FL. Omnicell M5000. www.omnicell.com/mts. Date: Copyright 2017."
"Omnicell, Inc., St. Petersburg, FL. Omnicell Product Catalog vol. 3. Date: 2016."
"Omnicell, Inc., St. Petersburg, FL. Omnicell Vbm 200F. Date: Copyright 2016."
"Omnicell, Inc., St. Petersburg, FL. Optimize Your Pre-Pack Operation. www.mts-mt.com. Date: Copyright 2017.".
"Pharmacy Times. Automation Benefits Pharmacies Large and Small. https://www.pharmacytimes.com/publications/issue/2008/2008-1212008-12-5030. Date: Dec. 1, 2008."
"Pillvac, LLC. Pillvac website excerpt. http://pillvac.com/home.htm. Date: 2017."
"RX Automation Solutions. Unit of Use Dispensing & Labeling System Single Channel. http://www.rxas.com/products/mail-order-central-fill-pharmacy/fulfillment-system/. Date: Copyright 2018."
"ScriptPro, Mission, KS. ScriptPro Telepharmacy product description. http://www.scriptpro.com/Products/Pharmacy-Workflow-Systems/Telepharmacy/. Date: Copyright 2018."
"Synergy Medical, Longueuil, Quebec, Canada. Synergy Medical SynMed System—product video excerpts. http://synmedrx.com/synmed-videos/. Date: Oct. 2008."
"Synergy Medical, Longueuil, Quebec, Canada. Synmedrx website excerpts. https://synmedrx.com. Date: Copyright 2016."
"Tosho, Tokyo, Japan. U2 Xana-4001 U2. Date: Undated."

* cited by examiner

PLURAL-MODE AUTOMATIC MEDICAMENT PACKAGING SYSTEM

RELATED APPLICATIONS

The present application is a continuation of and claims priority to U.S. patent application Ser. No. 17/338,790, filed Jun. 4, 2021, now U.S. Pat. No. 11,542,054, which is a continuation of and claims priority to U.S. patent application Ser. No. 16/571,368, filed Sep. 16, 2019, now U.S. Pat. No. 11,027,872, which is a continuation of and claims priority to U.S. patent application Ser. No. 15/243,613, filed Aug. 22, 2016, now U.S. Pat. No. 10,427,819, and claims priority from and the benefit of U.S. Provisional Patent Application No. 62/209,659, filed Aug. 25, 2015, the disclosure of each of which is hereby incorporated herein by reference in its entirety.

FIELD OF THE INVENTION

The invention relates to packaging systems and, more particularly, to packaging systems capable of dispensing and packaging medicaments in selected different types of packages.

BACKGROUND OF THE INVENTION

Automatic dispensing machines are utilized by retail and mail order pharmacies and by pharmacies of hospitals, nursing homes and other long-term care facilities to automatically provide medicaments and nutriceuticals required to fulfill patient prescription orders. Such automatic dispensing machines are computer controlled and can automatically dispense loose, bulk form medicaments from on-board storage units, such as cassettes. The dispensed medicaments can subsequently be packaged in pouch packages by means of an on-board form, fill and seal packaging unit.

The automatic dispensing machines are efficient and have a high rate of dispensing and packaging throughput. However, the automatic dispensing machines are also relatively expensive and can cost hundreds of thousands of dollars because of the sophisticated automation necessary to program and operate the machines.

Increasingly, medicaments are required to be delivered to the patient packaged in what is known as a “compliance” or “multi-dose” package. A compliance package is a type of packaging in which the medicaments are arranged in a package or packages by medicament type and quantity and in a sequence in which each medicament is to be taken by the patient. Each medicament represents a separate dosage unit. For example, a plurality of compliance packages could be serially organized by patient and by time of day at which the medicaments are to be taken by the patient (e.g., breakfast, lunch, dinner, bed time). The medicaments in the compliance package are taken by the patient in the sequence, first-to-last, in which medicaments are provided in the compliance package.

The compliance package represents an important improvement over conventional containers such as vials and bottles which include a 30, 60, or 90 day count of medicaments. With conventional medicament containers, the responsibility for following the physician’s prescription order lies with the patient who must select and access the required medicament from the containers at the correct time of day. This may be difficult for some patients because the containers may look alike and because the patient must remember the sequence in which the medicaments are to be taken. In contrast, compliance packaging shifts responsibility for following the physician’s prescription order to the pharmacy by enabling the pharmacy to place the medicaments in the proper sequence for the patient. In short, compliance packaging which can be provided by the pharmacy encourages the patient to comply with the doctor’s prescription order, potentially resulting in improved health outcomes.

Pouch packages of the type output from the aforementioned automatic dispensing machines can represent a type of compliance packaging. This is because the individual pouch packages can be grouped and loaded by the patient and arranged serially in a pouch package web (also referred to as a “strip” or “vine”). Each individual pouch package can contain each required medicament to be taken at a particular time and the pouch packages collectively can be arranged in the web in the sequence one-after-the-other in which the medicaments are to be taken by the patient. Pouch packages are not limited to multi dose compliance packaging and can also be utilized for “unit dose” packaging in which all or a certain number of packaged medicaments are alike.

Pouch packages are excellent packages in which to deliver medicaments for reasons such as those just described. However, pouch packages may not be an optimal packaging solution for all applications and patients. Pouch packages in the form of a long pouch package web can be unwieldy to handle and can require winding on a spool. Pouch package segments require careful management to avoid loss or co-mingling with pouch packages for another patient. Other types of medicament packaging, such as blister packaging, may be more optimally suitable for use in certain applications.

A limitation of automatic medicament dispensing machines, including machines that package medicaments in pouch packages, is that such machines can package medicaments in just a single type of package. This limitation prevents a pharmacy from utilizing the automatic dispensing machine with a type of package other than that for which the machine was designed. Many pharmacies are unable to afford more than one of the sophisticated and costly automatic dispensing machines and are thereby limited to providing medicaments in just a single type of package which may not be optimal for all applications.

There is a need for an improved automatic medicament packaging system which would improve the medicament dispensing process, which would make the medicament dispensing process more responsive to the needs of the pharmacy and the patients served by the pharmacy, which would reduce cost, and which would generally improve the quality of patient care.

SUMMARY OF THE INVENTION

The present invention is an improvement in medicament packaging systems. In one embodiment, a plural-mode automatic medicament packaging system is provided. A packaging system may include an automatic medicament dispensing unit, a pouch packaging unit, a blister package packaging unit and a plural-position medicament diverter.

The automatic medicament dispensing unit may include a plurality of medicament storage and dispensing units. The medicament storage and dispensing units may dispense medicaments stored therein in any sequence required for packaging.

In one packaging mode, the pouch packaging unit may be paired or positioned for operation with the automatic dispensing machine. The pouch packaging unit may package medicaments from a storage and dispensing unit in one or more pouch package.

In a further packaging mode, the blister package packaging unit is used in place of the pouch packaging unit. The blister package packaging unit receives medicaments from the automatic dispensing machine and packages the medicaments in blister packages. In embodiments, a blister packaging unit may include a robotic pick-and-place device which loads medicament into a cell of the blister package and a sealer unit which seals the blister package after loading.

In a first-mode position, medicaments may be delivered from the medication and storage units of the automatic medicament dispensing unit without interference by the diverter. As a result, medicaments may be received by the pouch packaging unit and packaged in pouch packages by the pouch packaging unit. In a second-mode position, the diverter redirects medicaments from the medication and storage units of the automatic medicament dispensing unit to the blister package packaging unit. Medicaments received by the blister package packaging unit may be packaged in blister packages by the blister package packaging unit.

Further aspects of the plural-mode automatic medicament packaging system are described in the drawings and detailed description which follow.

BRIEF DESCRIPTION OF THE DRAWINGS

Exemplary systems and apparatus for a plural-mode automatic medicament packaging system may be understood by reference to the following description taken in conjunction with the accompanying drawings, in which like reference numerals identify like elements throughout the different views. The drawings are not necessarily to scale, emphasis instead being placed upon illustrating the principles of the invention. The drawings depict only embodiments of the invention and are not therefore to be considered to be limiting of the scope of the invention. In the accompanying drawings.

DETAILED DESCRIPTION OF THE INVENTION

Figure 1:
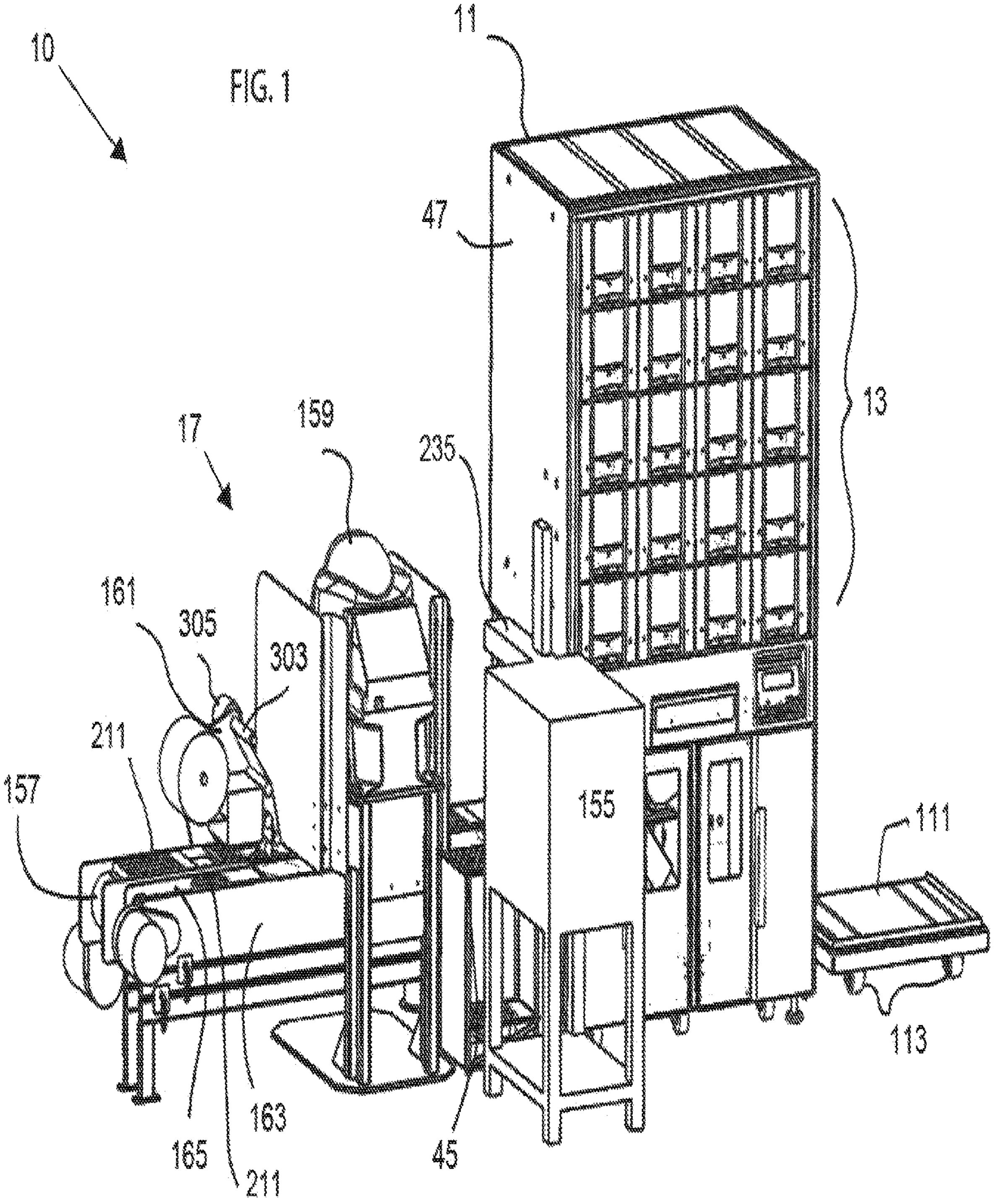
FIG. 1 is a perspective view of an embodiment of a plural-mode automatic medicament packaging system according to the invention illustrated in a first packaging mode enabling medicament packaging in pouch packages.
Figure 2:
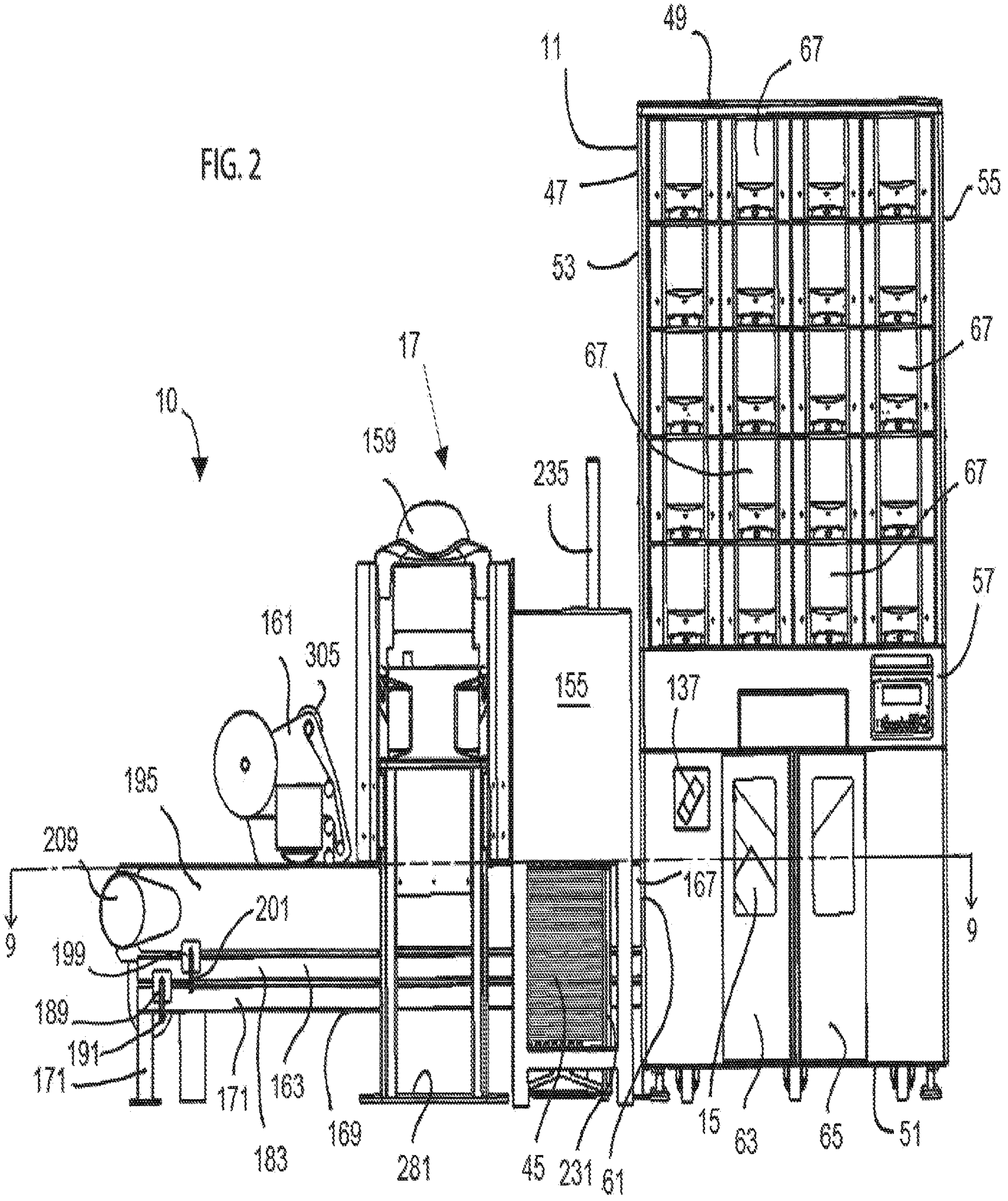
FIG. 2 is a front elevation view of the packaging system of FIG. 1.
Figure 3:
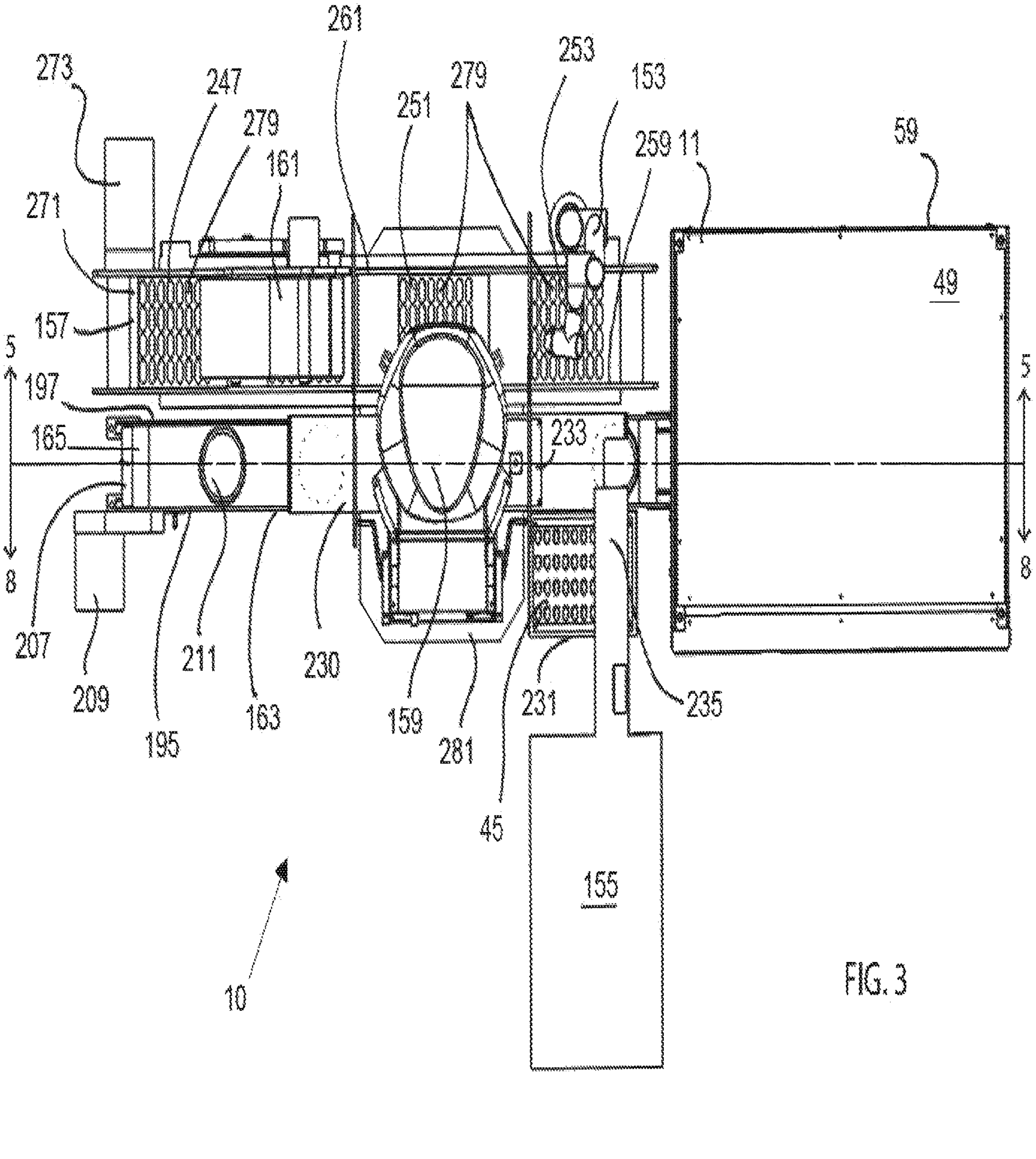
FIG. 3 is a top plan view of the packaging system of FIG. 1.

Referring first to FIGS. 1-17, there is shown an embodiment of a plural-mode automatic medicament packaging system 10 according to the invention. In the embodiment, packaging system 10 may include an automatic dispensing machine 11 having an automatic medicament dispensing unit 13. Packaging system 10 may further include a pouch packaging unit 15 and a blister package packaging unit 17 which cooperate with dispensing machine 11 to package medicaments, such as medicaments 19, 21, 23, 25, 27, 29, 31, in different types of packages. For convenience and brevity, medicaments 19-31 will generally be referred to by the single reference number 19.

Packaging system 10 may operate in one of a plurality of packaging modes to package medicaments 19 in different package types. In a first packaging mode, medicaments dispensed from medicament dispensing unit 13 may be packaged by pouch packaging unit 15 into pouch packages such as pouch packages 33, 35, 37, 39, 41, 43 illustrated in FIGS. 18-19. For convenience and brevity, all pouch packages will be referred to by reference number 33, it being understood that the other pouch packages 35-43 may be identical. In a second packaging mode, medicaments 19 dispensed from dispensing machine 11 may be packaged by blister package packaging unit 17 into blister packages, such as blister package 45 illustrated in FIGS. 20-22.

Pouch packages 33-43 and blister packages 45 may be of a compliance or multi-dose type in which such packages contain medicaments 19 in a sequence in which the medicaments 19 are to be taken by a patient in accordance with a physician's instructions. Alternatively, such packages could be of a unit dose type, for example, containing the same type of medicament 19 which may then be provided to any patient.

Packaging system 10, therefore, enables a pharmacy to automate medicament 19 dispensing and packaging utilizing different types of packages by means of a single packaging system 10. Costs are significantly reduced because one packaging system 10 can do the work of many packaging systems, enabling delivery of health care at a lower price and generally improving the quality of patient care.

Referring again to FIGS. 1-17, packaging system 10 may be controlled by a controller 12 (FIG. 17) which may be one or more programmable computer with one or more central processing unit ("CPU") and associated memory. Controller 12 may be programmed with a set of instructions, which may be in the memory of controller 12, for execution by packaging system 10.

Controller 12 may, for example, consist of a main frame computer, a computer server, a personal computer ("PC"), or plural operably-connected servers or PCs. Controller 12 may include a computer 14 illustrated as being within automatic dispensing machine 11. Controller 12 through computer 14 may control all aspects of operation of packaging system 10 including automatic dispensing machine 11, medicament dispensing unit 13 of automatic dispensing machine 11, pouch packaging unit 15, blister package packaging unit 17 as well as a diverter 163.

One of ordinary skill in the art will appreciate that controller 12 can be dedicated to packaging system 10 or can be a computer which is shared by multiple modules, including a pharmacy information system which controls the overall operation of a pharmacy in addition to operating packaging system 10. Controller 12 may be in data-transmission relationship with automatic dispensing machine 11, medicament dispensing unit 13 of automatic dispensing machine 11, pouch packaging unit 15, blister package packaging unit 17 as well as a diverter 163.

Referring to FIGS. 1-10, automatic dispensing machine 11 and dispensing unit may include a housing 47 which may enclose medicament dispensing unit 13 and pouch packaging unit 15 when pouch packaging unit 15 is mounted in dispensing machine 11. Housing 47 may include top and bottom walls 49, 51, left and right side walls 53, 55, and front and rear walls 57, 59. In one embodiment, side wall 53 may include a removable access panel 61 which may enable dispensing machine 11 to operate with blister package packaging unit 17 as described herein. Access panel 61 may be removably secured to housing 47 by any suitable means including by fasteners, clips, latches or the like which enable easy removal of access panel 61 from housing 47.

Housing 47 may further include a pair of access doors 63, 65 in front wall 57. Doors 63, 65 close and open to allow a technician to access components internal to housing 47, such as pouch packaging unit 15. Doors 63, 65 may also be opened to mount and remove pouch packaging unit 15 from dispensing machine 11 as described herein. In certain embodiments, packaging system 10 may be configured so that pouch packaging unit 15 could simply be moved aside while remaining in automatic dispensing machine 11 or so that pouch packaging unit 15 could remain in place with diverter 163 redirecting medicaments 19 to pouch package packaging unit 17.

In the example, medicament dispensing unit 13 of automatic dispensing machine 11 may be located at least partially within housing 47 above the position of pouch packaging unit 15. Medicament dispensing unit 13 may include a plurality of pull-out drawers indicated by reference number 67. For convenience and brevity, reference number 67 designates each such drawer, it being understood that the drawers are identical in the example. In the example, the drawers 67 are organized into five rows and four columns of drawers for twenty total drawers 67. Any number of drawers may be provided. Structure other than drawers may also be provided.

Figure 6:
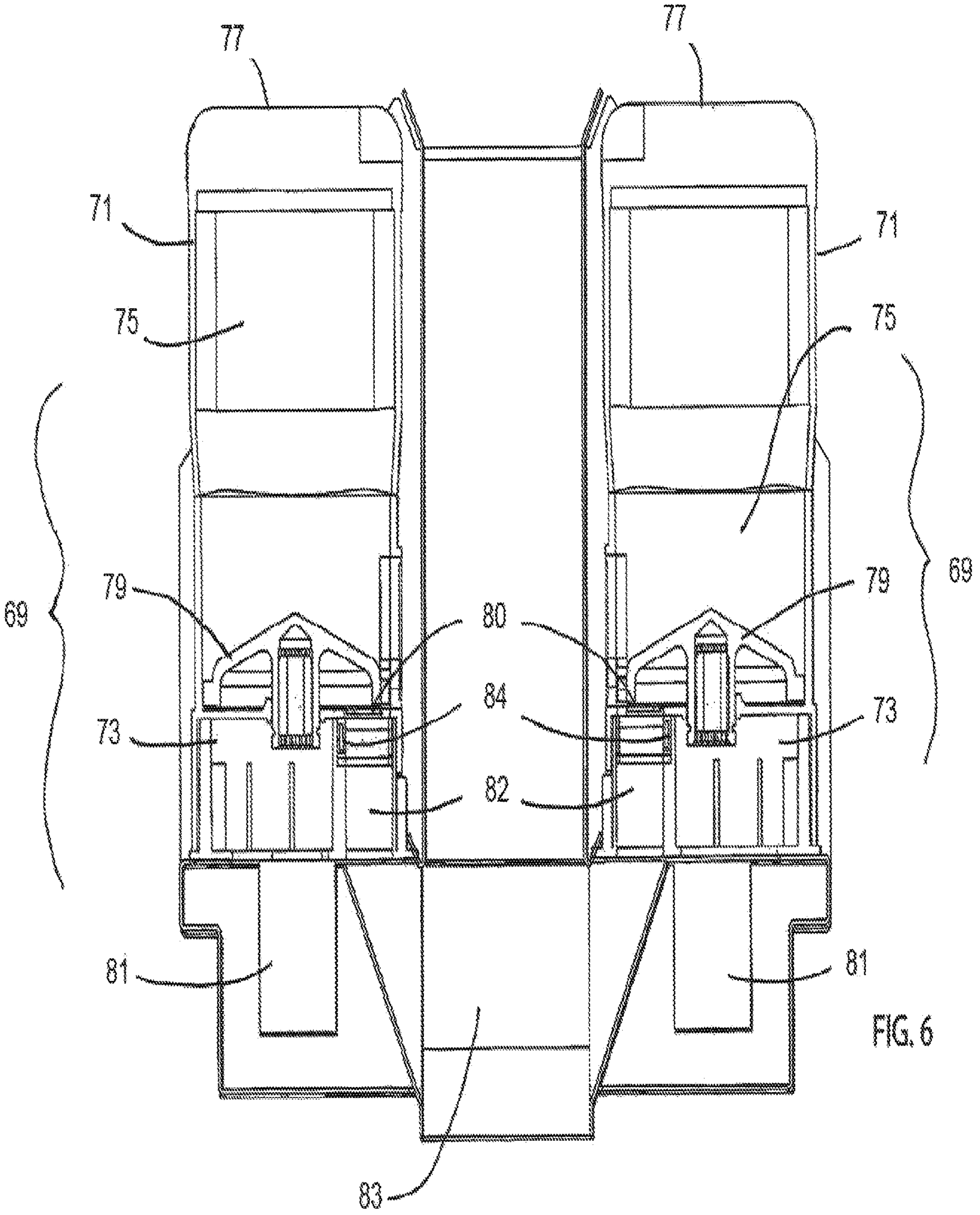
FIG. 6 is a view of medicament storage and dispensing units of the packaging system of FIG. 1 with certain surfaces cut away to facilitate understanding.
Figure 8:
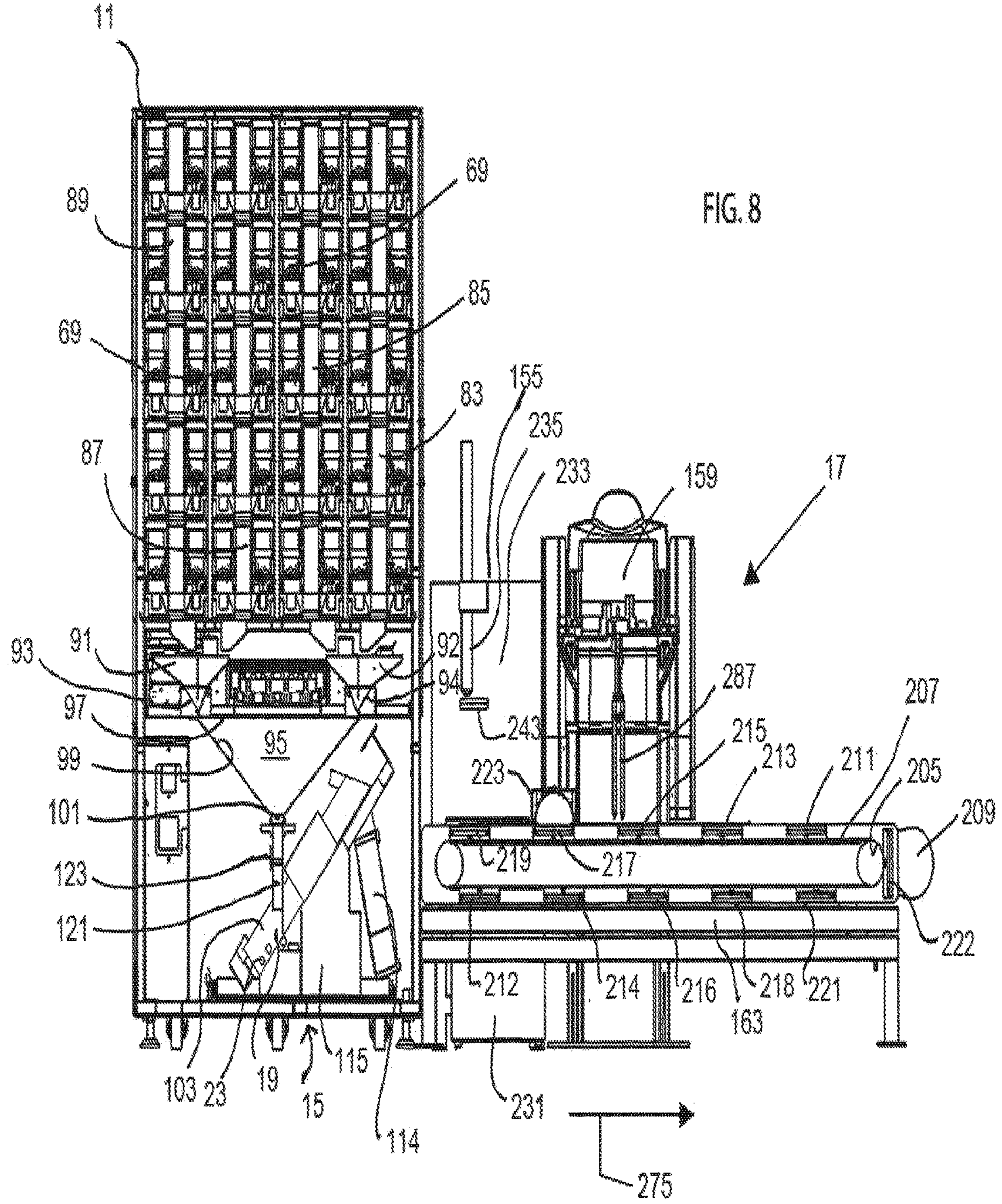
FIG. 8 is a section view of the packaging system taken along section 8-8 of FIG. 3.

As illustrated in FIGS. 6 and 8, each drawer 67 may support a plurality of removable medicament storage and dispensing units indicated by reference number 69. For convenience and brevity, reference number 69 designates each storage and dispensing unit, it being understood that the storage and dispensing units are identical in the example. Any number of storage and dispensing unit 69 may be provided. Storage and dispensing units 69 may be of a cassette type as illustrated or may be of another type capable of storing and dispensing medicaments 19 or other items therefrom.

Each storage and dispensing unit 69 is provided to store a bulk quantity of loose, free flowing medicaments such as the solid tablet-form medicaments 19-31 described previously and illustrated in FIG. 20. Each storage and dispensing unit 69 can also dispense, or output, such medicaments 19 for subsequent packaging.

One type of medicament 19 is typically stored in each storage and dispensing unit 69. The type of medicament 19 in each storage and dispensing unit 69 may be stored in a database associated with controller 12, enabling packaging system 10 to activate only the storage and dispensing unit(s) 69 containing the necessary medicament 19.

Typically, medicaments 19 stored in such storage and dispensing units 69 are of types which are prescribed and used more frequently to fulfill patient prescription orders. Such frequently-used medicaments 19 may be referred to as "fast movers." Medicament 19 (and medicaments 21-31) is merely an example because any flowable item could be stored in a storage and dispensing unit 69.

In one embodiment, storage and dispensing units 69 may each include a cassette 71 removably mounted on a motor base 73. Motor base 73 may be controlled by controller 12. Motor base 73 may be supported on a drawer such as a drawer 67. Cassette 71 may include a hopper 75 which receives and stores medicaments 19. Cassette 71 and hopper 75 may be covered by a removable lid 77. Cassette 71 may be initially loaded or replenished with medicaments 19 by removing lid 77 and pouring medicaments 19 into hopper 75 with the quantity loaded being updated in the database associated with controller 12. Such loading may occur with cassette 71 mounted on motor base 73 or at a workstation spaced from packaging system 10 after first removing cassette 71 from motor base 73.

Each storage and dispensing unit 69 may further include a rotor 79 toward a bottom of hopper 75 in medicament-flow relationship with the hopper bottom opening 80. A motor 81 associated with motor base 73 controlled directly or indirectly by controller 12 may be in power-transmission relationship with rotor 79 when hopper 75 is mounted on motor base 73 to power rotation of rotor 79. As rotor 79 rotates under power of motor 81, medicaments 19 flow by means of gravity downward in hopper 75 toward rotor 79 and are dispensed, or output, from a port 82 in the storage and dispensing unit 69 as illustrated in FIG. 6 in a singulated manner one-after-the-other.

A counter 84 registers a count each time a medicament 19 passes counter 81 and is dispensed or output from a storage and dispensing unit 69. For example, a medicament passing counter 84 could break an infra-red energy source (not shown) across port 82 to register a count. The count information may be used directly or indirectly by packaging system 10 controller 12 to track the quantity of medicaments 19 dispensed or output in each operation of the storage and dispensing unit 69 and may be a first control to ensure that the correct quantity of medicaments 19 have been dispensed. Motor 81 is deactivated to stop further medicament 19 dispensing when the required count has been reached.

Each storage and dispensing unit 69 may be replenished as medicaments 19 stored therein are dispensed during repeated medicament 19 packaging operations. Replenishment may be accomplished merely by manually pulling or sliding out the drawer 67 on which the storage and dispensing unit 69 to be replenished is mounted followed by refilling the storage and dispensing unit 69 with a bulk quantity of medicaments 19 as described previously. As previously stated, any number or type of storage and dispensing units may be provided as components of medicament dispensing unit 13 of automatic dispensing machine 11, and storage and dispensing units 69 are merely examples.

After being dispensed, or output, from a storage and dispensing unit 69, medicaments such as medicament 19 may fall down by means of gravity through one or more vertical chutes 83, 85, 87, 89 and into a funnel-shaped hoppers 91, 92 beneath medicament dispensing unit 13 chutes 83, 85, 87, 89. Movable valve-like shutters 93, 94 control flow of medicaments 19 from hoppers 91, 93 into guide 95 so as to permit simultaneous staging of two different types of medicaments 19 in hoppers 91, 92. Guide 95 has a wide top opening 97 which receives the medicaments 19, downwardly-sloped angled walls 99 and a narrow bottom opening 101 which directs medicaments 19 toward a packaging unit, which may be pouch packaging unit 15 or blister package packaging unit 17 depending on the mode in which packaging system 10 is configured as explained in more detail below.

Any number and size of automatic dispensing machines 11 may be utilized as the packaging system 10 may be scaled to meet the needs of the pharmacy. Automatic dispensing machine 11 is intended to be an example.

As stated, packaging system 10, automatic dispensing machine 11 and medicament dispensing unit 13 may operate under control of instructions from controller 12 to operate storage and dispensing units 69 to dispense, or output, all medicaments 19 required to fulfill any pending prescription order (i.e., a prescription order that has been approved for fulfillment). Instructions for dispensing each medicament 19 may reside in a separate file residing in a database in memory of such controller 12. Each file may contain all information necessary for dispensing and packaging of each medicament 19 including patient name, physician name, medicament type and strength, medicament lot number, time of day on which medicament 19 is to be taken and any other pertinent information.

Each file may also be updated to create a record of each count from counter 81 as each medicament 19 is dispensed from a storage and dispensing unit 69 to confirm that the actual medicament count matches the required medicament count for each pouch package 33 or blister package 45.

It will be understood that "file" is intended to be a broad term which means or refers to one or more elements of data stored in memory which may be recalled by packaging system 10. It will be further understood that multiple memory locations may be utilized for storing the data elements relating to each file. Therefore, the term "file" as used herein refers to the data elements for any given pouch package 33 or blister package 45.

Storage and dispensing units 69 may dispense such medicaments 19 in any sequence to fulfill the pending prescription orders. Thus, all medicaments 19 for a patient may be dispensed from a storage and dispensing unit 69 in the sequence in which the medicaments 19 are to be taken by the patient according to the physician's instructions embodied in the physician's prescription order.

Figures 18, 19:
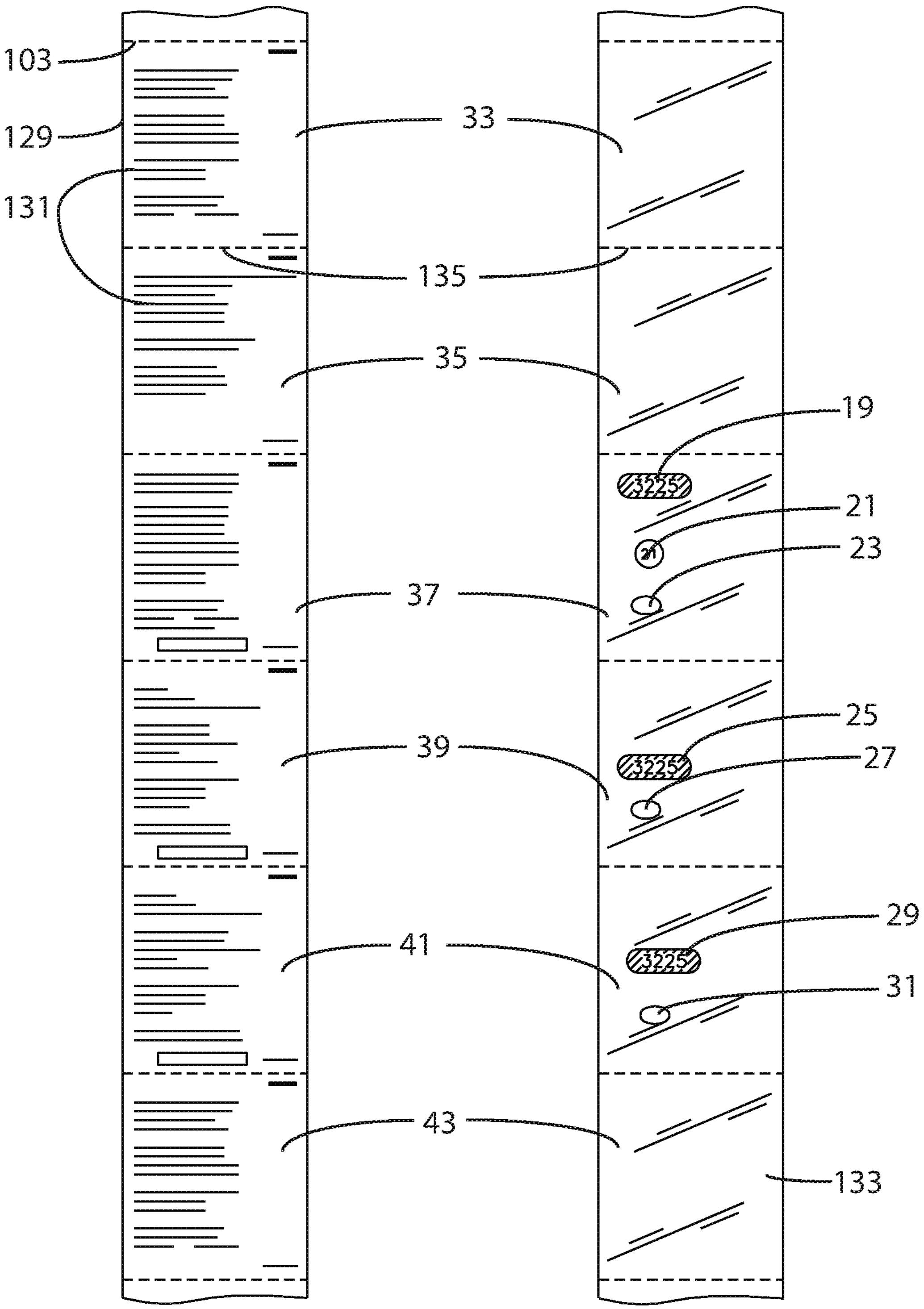
FIGS. 18-19 illustrate an exemplary pouch package web including discrete pouch packages formed therein.

Referring now to FIGS. 1-13 there is shown an embodiment of a pouch packaging unit 15 which may be utilized when packaging system 10 is in the first packaging mode. Pouch packaging unit 15 may be controlled directly or indirectly by controller 12. As described in detail below, pouch packaging unit 15 may package medicaments 19 dispensed from medicament dispensing unit 13 into pouch packages 33-43 formed in a pouch package web 103 (FIGS. 18-19).

In the example, pouch packaging unit 15 may be a modular, self-contained and integrated packaging unit. Pouch packaging unit 15 may be mounted within housing 47 of automatic dispensing machine 11 on platform 105. Doors 63, 65 may be opened to access pouch packaging unit 15 for service or for removal or mounting of pouch packaging unit 15 within dispensing machine 11 to accommodate a change in packaging modes of packaging system 10.

In the example, platform 105 is mounted for back-and-forth sliding movement on telescoping rails 107, 109 between the operating position of pouch packaging unit 15 illustrated in FIGS. 1-5 and 8 and the position in which pouch packaging unit 15 is removed from automatic dispensing machine 11. The operating position of pouch packaging unit 15 refers to the state in which packaging system 10 is ready to function in the mode for pouch packaging. Pouch packaging unit 15 may be secured to platform 105 in any manner, including by quick-release latches or the like. This structure enables pouch packaging unit 15 to be slid into or out of (i.e., to translate) automatic dispensing machine 11 housing 47. When slid on platform 105 out of housing 47, pouch packaging unit 15 may be detached from platform 105 and transferred to cart 111 as illustrated in FIGS. 10-13. Cart 111 may include caster wheels (one wheel indicated as 113) to enable cart 111 and pouch packaging unit 15 loaded thereon to be easily moved away from packaging system 10 (FIGS. 11-13) when packaging system 10 is in a packaging mode for use with blister package packaging unit 17 or a further packaging module.

Referring again to FIGS. 1-8 and 18-19, when pouch packaging unit 15 is in the operating position, pouch packaging unit 15 packages medicaments 19 dispensed from storage and dispensing units 69 into separate pouch packages 33 to generate, or create, a pouch package web 103. The material comprising web 103 may be supplied before use as a thin flexible film material wound into a supply roll 114 mounted for rotation on a motor-driven spindle (not shown) of frame 115 of pouch packaging unit 15. The material which may be used for web 103 may be a lightweight low density polyethylene ("LDPE") film.

Exemplary pouch packaging unit 15 may further comprise a printer 117, and a sealer and perforation unit 119 supported by frame 115. The operation of pouch packaging unit 15 is carefully synchronized directly or indirectly by controller 12 with operation of dispensing unit 13 and each motor base 73 to dispense and package medicaments 19 in accordance with file information as described herein so that the automatic dispensing machine 11 can preferably produce any desired arrangement of pouch packages 33.

Figure 4:
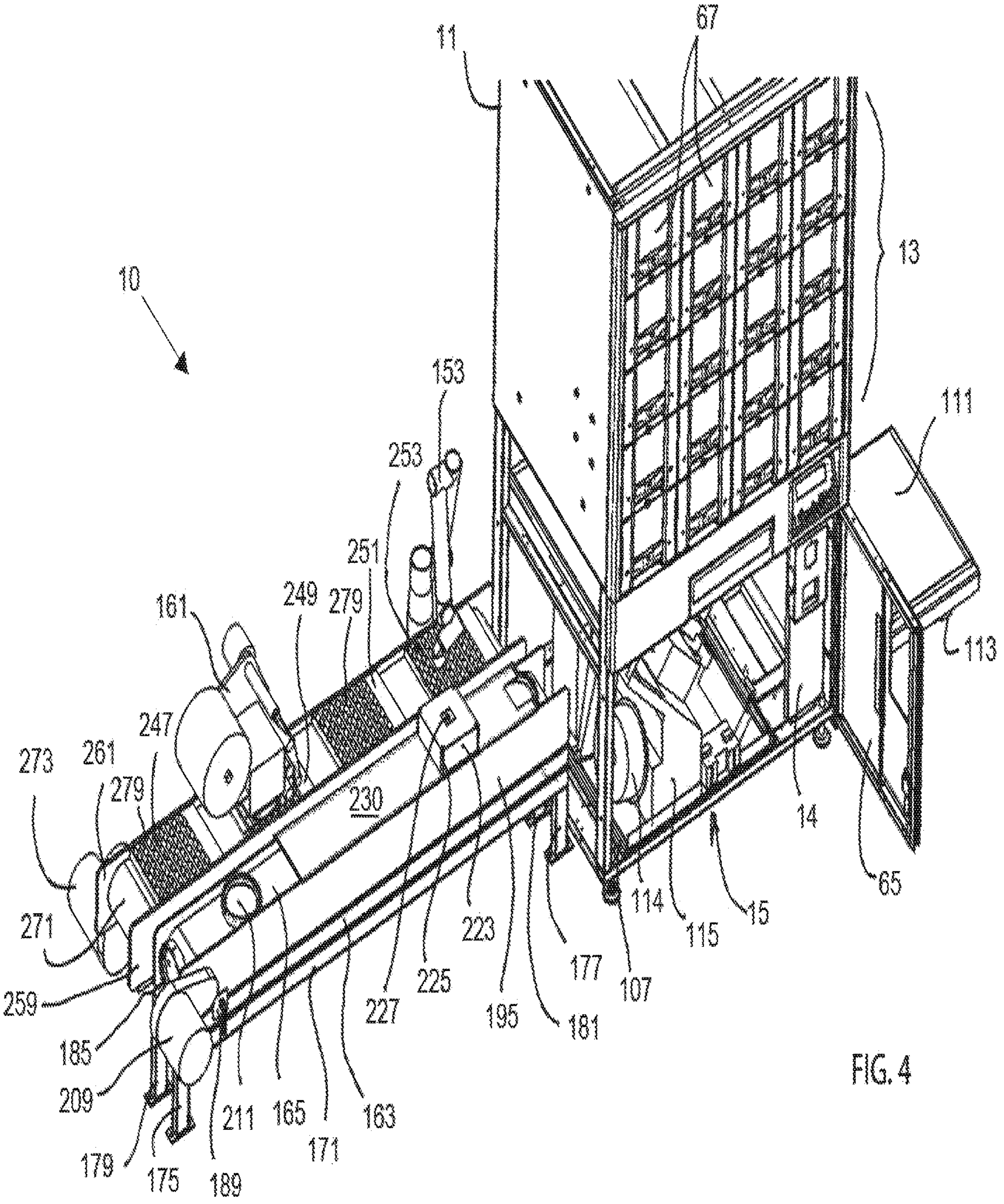
FIG. 4 is a perspective view of the packaging system of FIG. 1, but with certain components removed to facilitate understanding.
Figure 5:
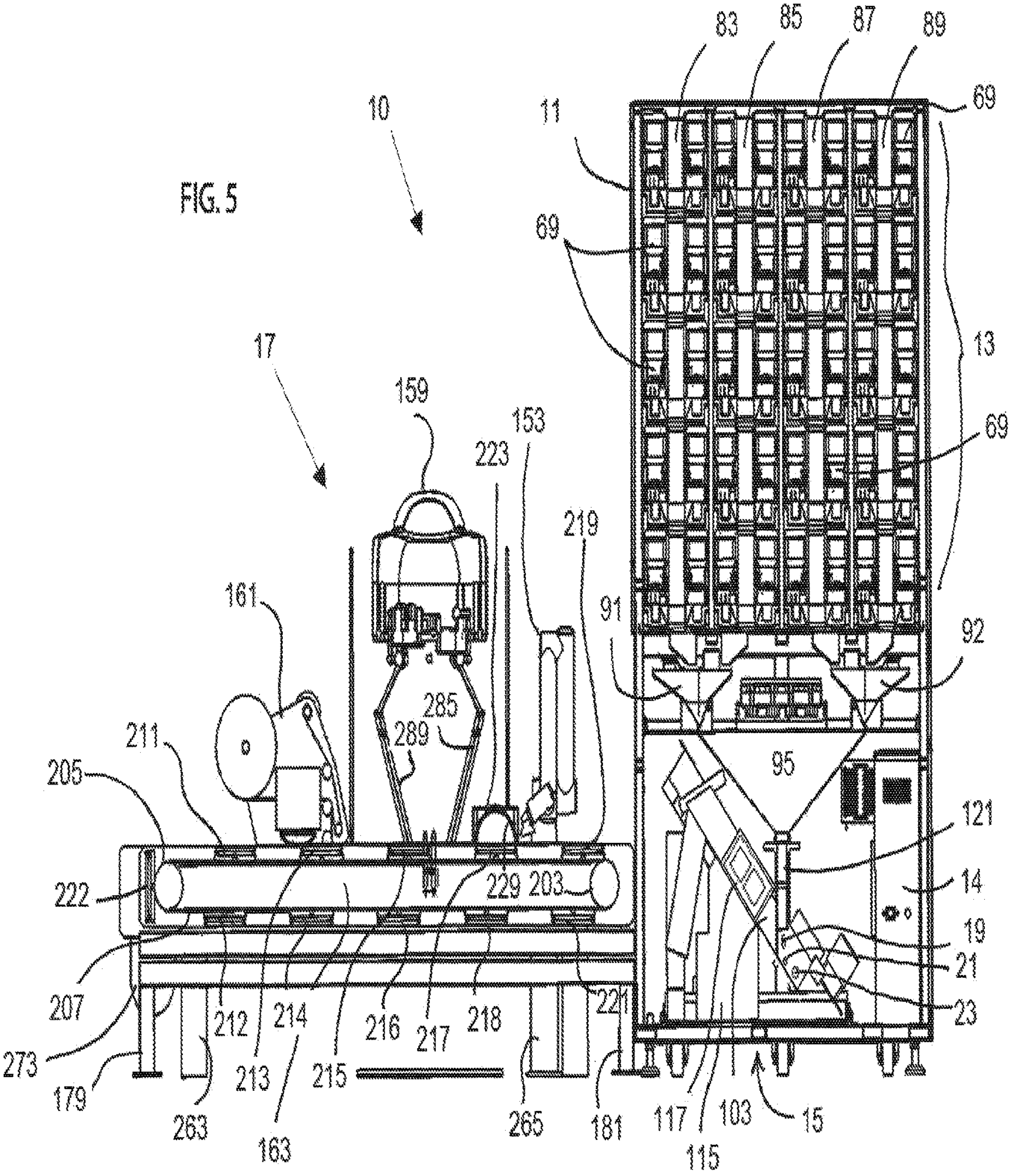
FIG. 5 is a section view of the packaging system taken along section 5-5 of FIG. 3.

Referring to FIGS. 4-8, each medicament 19 falls from guide 95 and into tube 121 of pouch packaging unit 15. When pouch packaging unit 15 is mounted for operation in automatic dispensing machine 11, tube 121 is aligned with guide 95 bottom opening 101 (FIGS. 4-5 and 8). A valve-like shutter 123 across tube 121 may open and close to limit or allow movement of a medicament 19 through tube 121. When shutter 123 opens, a medicament 19 falls through tube 121 and exits tube 121 through nozzle 125 toward a lower end of tube 121.

Figure 7:
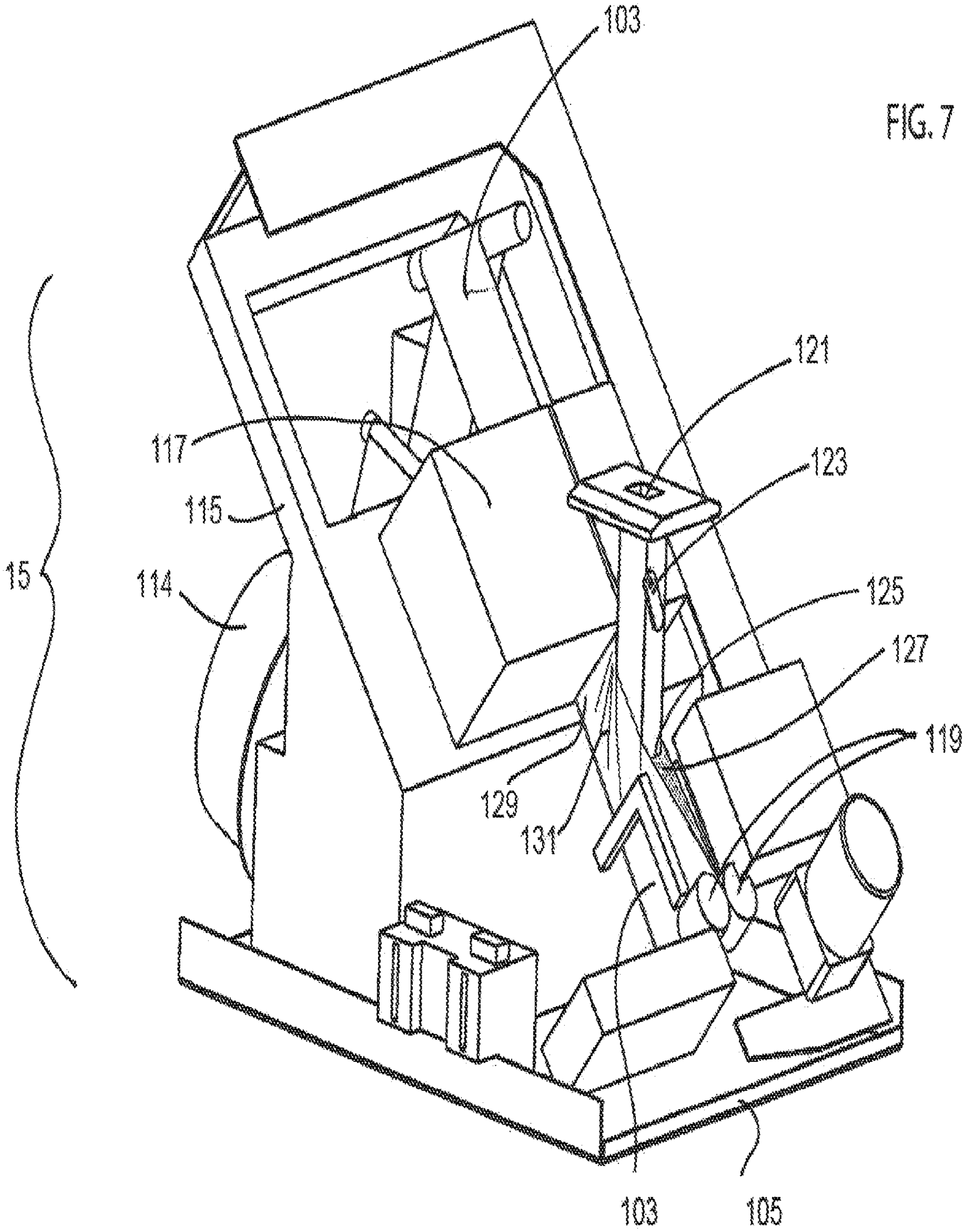
FIG. 7 is a perspective view of the pouch packaging unit of the packaging system of FIG. 1.

After exiting nozzle 125, medicaments 19 are packaged as represented schematically in FIG. 7. Pouch packaging unit 15 forms by folding a pocket 127 in pouch package web 103 as web 103 is unwound from supply roll 114. The pouch package web 103 may be folded in half by rollers (not shown) while web 103 is under tension to form pocket 127.

As illustrated in the example of FIGS. 7 and 18, pouch package web 103 may include an opaque or semi-opaque portion 129 which receives printed information 131 thereon and a transparent portion 133. Once a pouch package 33 is formed in pouch package web 103 as described above, opaque portion 129 becomes a first side of the pouch package 33 and the transparent portion 133 becomes a second side of the pouch package 33. Opaque portion 129 preferably contrasts with printed information 131 applied thereto and facilitates reading or machine detection (e.g., barcode recognition or optical character recognition) of the printed information 131. The transparent portion 133 permits each medicament 19 to be easily viewed within each pouch package 33 so that the contents of each pouch package 33 can be compared with the printed information 131 on the pouch package 33 for accuracy.

In the example, the folded web 103 is delivered to printer 117 shown schematically in FIG. 7. Printer 117 prints information on the folded web 103 opaque portion 129 adjacent the location where each pouch package 33 will be formed. In the example, the printing occurs before each medicament 19 for the pouch package 33 is loaded into pocket 127 from nozzle 125. Any suitable type of information-application device could be used in place of a printer 117. Advancement of web 103 is stopped momentarily by controller 112 so that printer 117 can apply printed information 131 to web 103 adjacent where each pouch package 33 will be formed.

Information 131 applied to pouch package web 103 adjacent the location of pouch package 33 may include any information deemed appropriate. Information 131 may include, for example: the patient name, instructions for taking the medicament 19 (e.g., date and time of day the medicament is to be taken), medicament information (e.g., medicament strength and type, medicament appearance information, quantity, lot number, and expiration date), and a machine-readable code, such as a barcode.

Referring further to FIG. 7, pouch packaging unit 15 fills, or loads, each required medicament 19 into pocket 127 formed in web 103 adjacent the corresponding printed information 131 for the pouch package 33. Nozzle 125 guides each medicament 19 into pocket 127. Dispensing of each medicament 19 from a storage and dispensing unit 69, or other storage and dispensing apparatus, for each pouch package 33 and loading of each medicament 19 into pocket 127 is carefully synchronized with application of information 131 by printer 117. At the same time that web 103 is momentarily stopped for printing, one or more medicament 19 is loaded into pocket 127 downstream from printer 117 adjacent the corresponding printed information 131 for the pouch package 33 into which each such medicament 19 is loaded.

Figure 9:
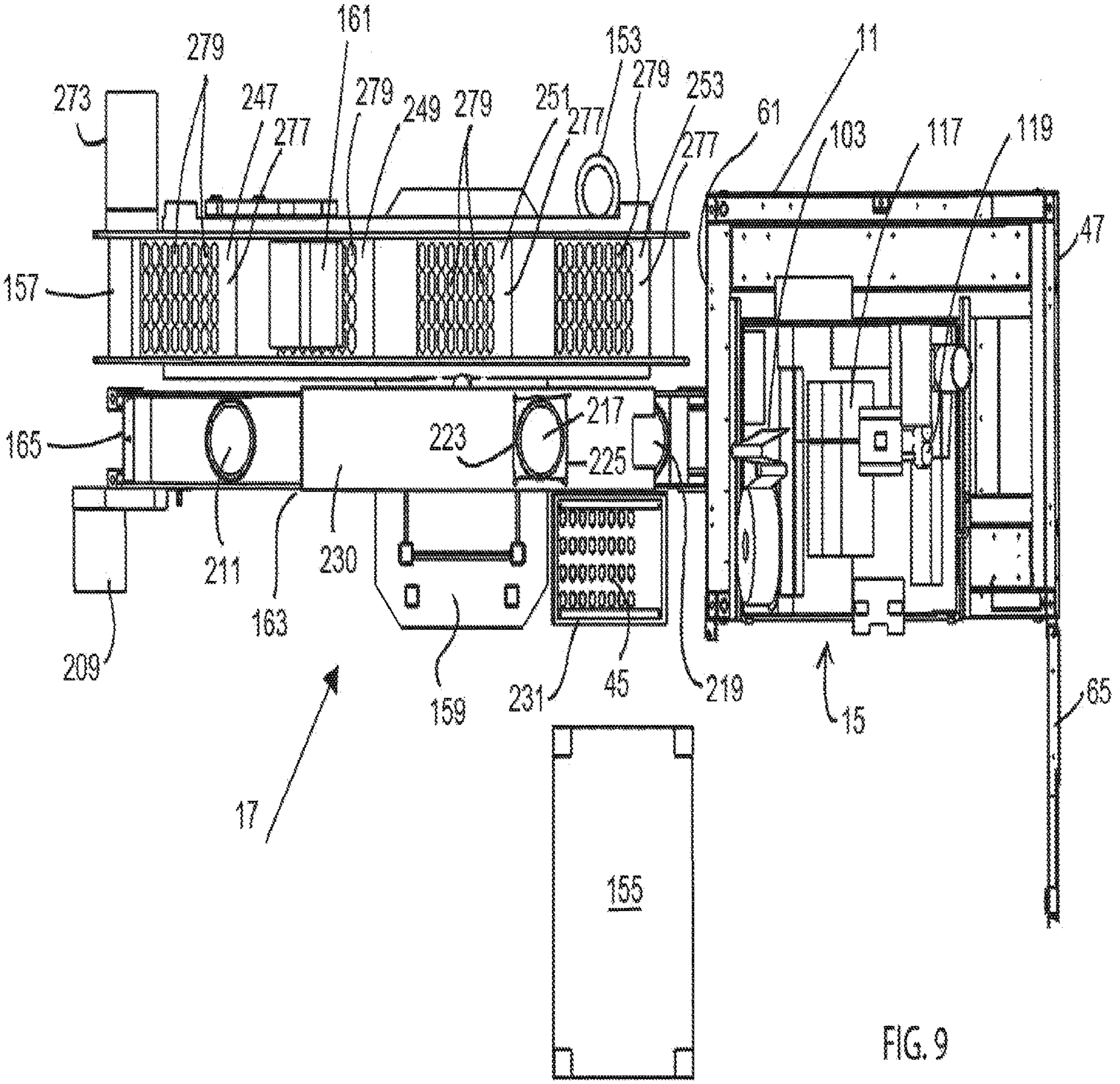
FIG. 9 is a section view of the packaging system taken along section 9-9 of FIG. 2 showing removal of a pouch packaging unit.
Figure 10:
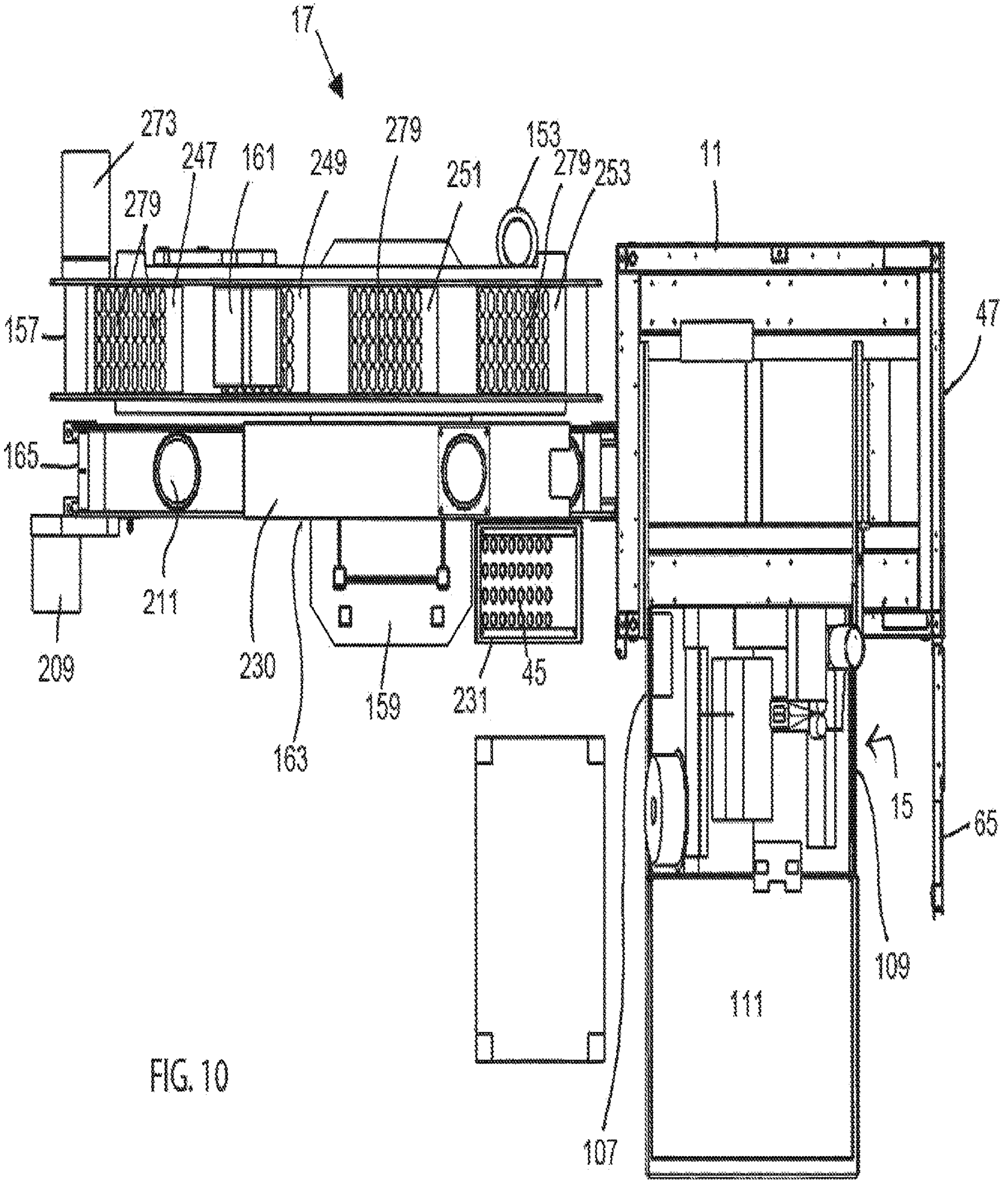
FIG. 10 is a section view of the packaging system taken along section 9-9 of FIG. 2 showing transfer of the pouch packaging unit to a cart.
Figure 11:
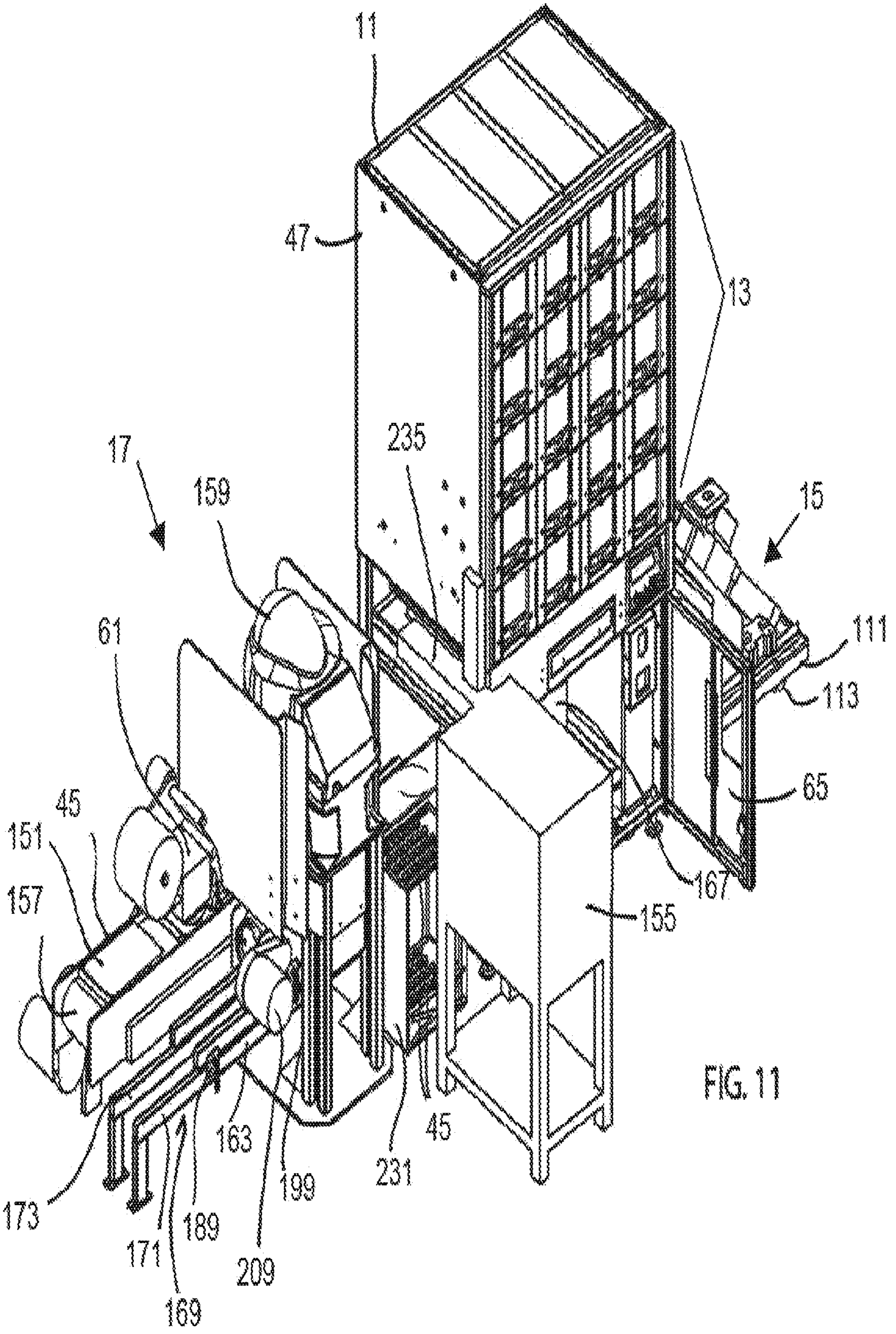
FIG. 11 is a perspective view of the packaging system of FIG. 1 but in a second mode enabling medicament packaging in blister packages.
Figure 12:
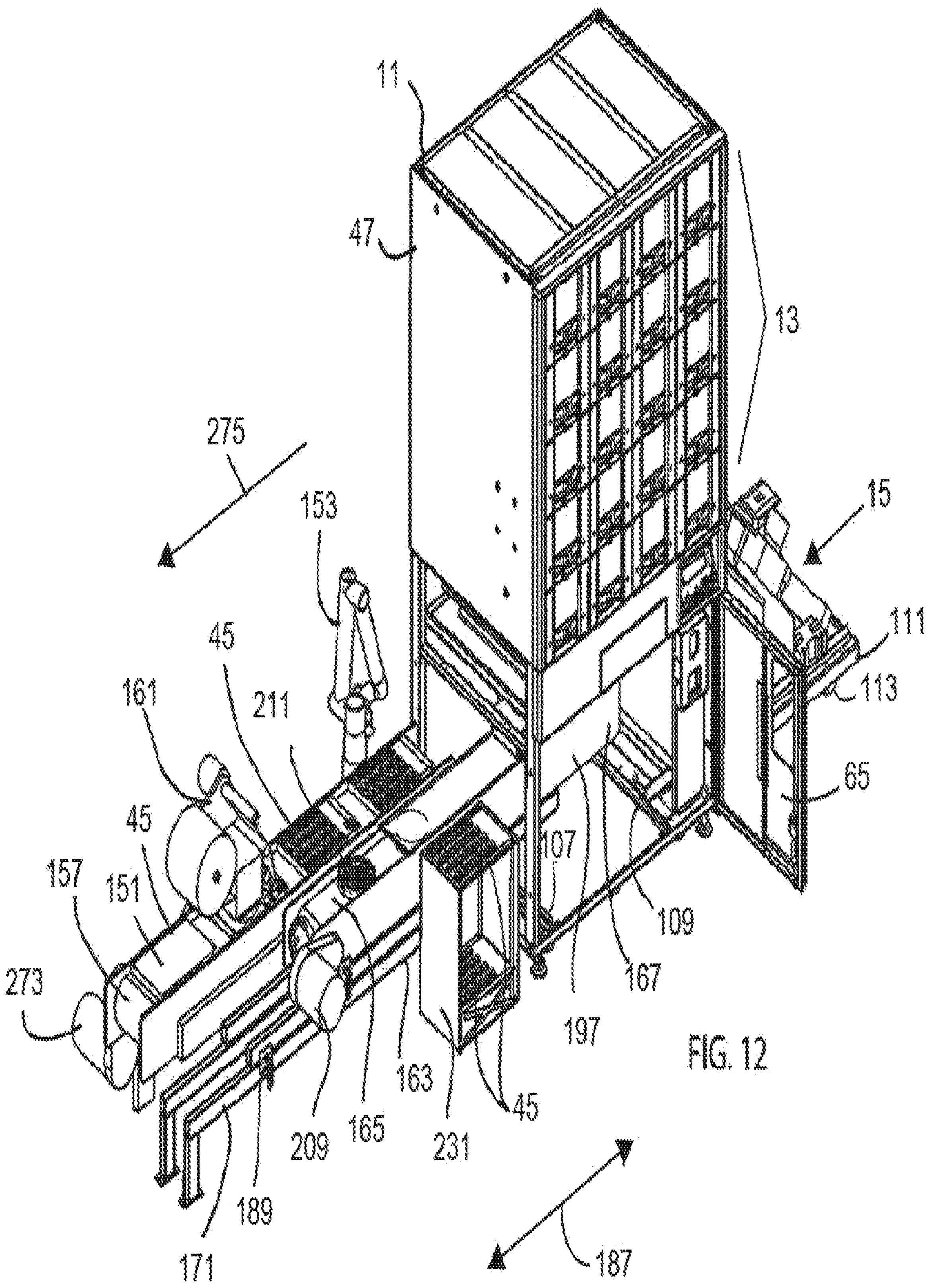
FIG. 12 is a perspective view of the packaging system of FIG. 11, but with certain components removed to facilitate understanding.

A sealer and perforator unit 119 shown schematically in FIG. 7, is used to seal each medicament 19 into a discrete, separate pouch package 33 formed in the pouch package web 103. Sealer and perforator unit 119 may seal web 103 into separate pouch packages 33 by advancing web 103 between heated sealing rollers such as illustrated in FIGS. 7 and 9-10 or by other means, such as sonic welding. The sealer and perforator unit 119 may also perforate web 103, making a perforation line 135 between each adjacent pouch package 33 to permit each formed pouch package 33 to be easily separated from the pouch package web 103 by tearing. In embodiments, packaging system 10 and automatic dispensing machine 11 may be capable of generating a separate pouch package 33 approximately every one second.

Web 103 and the pouch packages 33 formed therein are advanced from sealer and perforator unit 119 to outlet port 137 in front wall 57 of housing 47. Therefore, web 103 and pouch packages 33 formed therein exit port 137 even as further pouch packages 33 are being formed in web 103 by pouch packaging unit 15. After exiting port 137, web 103 including pouch packages 33 may fall into a collection bin, or may be wound onto a spool, or may simply fall onto a floor surface adjacent automatic dispensing machine 11 and outlet port 137. Exiting port 137 completes the packaging process for each pouch package 33 provided by the pouch packaging unit 15.

Packaging system 10 continues to operate in the first mode for packaging of medicaments 19 in pouch packages 33 until such time as the pharmacy desires to package medicaments 19 in a different type of package and packaging mode. When it is desired to configure packaging system 10 for operation in a further packaging mode, operation of packaging system 10 is temporarily stopped. In the example, pouch packaging unit 15 may be removed from dispensing machine 11 as described above. With pouch packaging unit 15 removed, packaging system 10 may be configured for operation in a further packaging mode such as for use with blister package packaging unit 17, as will now be described.

Referring now to FIGS. 1-5, 8-17 and 20-22, there is shown an embodiment of a blister package packaging unit 17 which may be utilized when packaging system 10 is in the second packaging mode. Blister package packaging unit 17 may be adapted to function with medicament dispensing unit 13 once pouch package packaging unit 15 is removed from automatic dispensing machine 11 as described above. Blister package packaging unit 17 may be provided to package medicaments 19 dispensed from medicament dispensing unit 13 into a blister package 45. Efficiencies are provided to the pharmacy because the same automatic dispensing machine 11 can be used with different packaging units 15, 17, or other packaging units, freeing the pharmacy from purchasing separate packaging systems for each different package type and increasing the utility of automatic dispensing machine 11 to the pharmacy.

Figure 20:
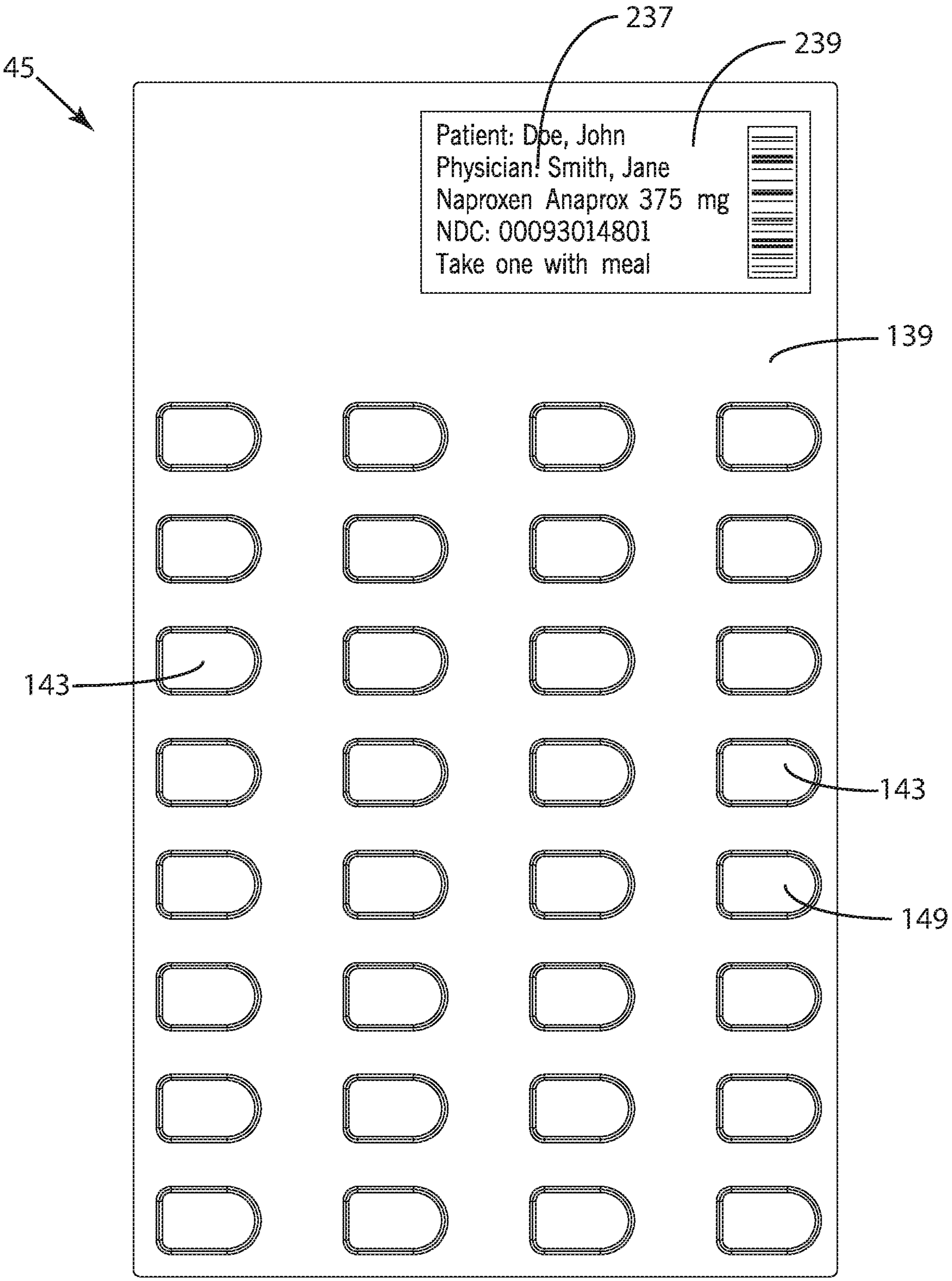
FIGS. 20-22 illustrate an exemplary blister package.
Figure 21:
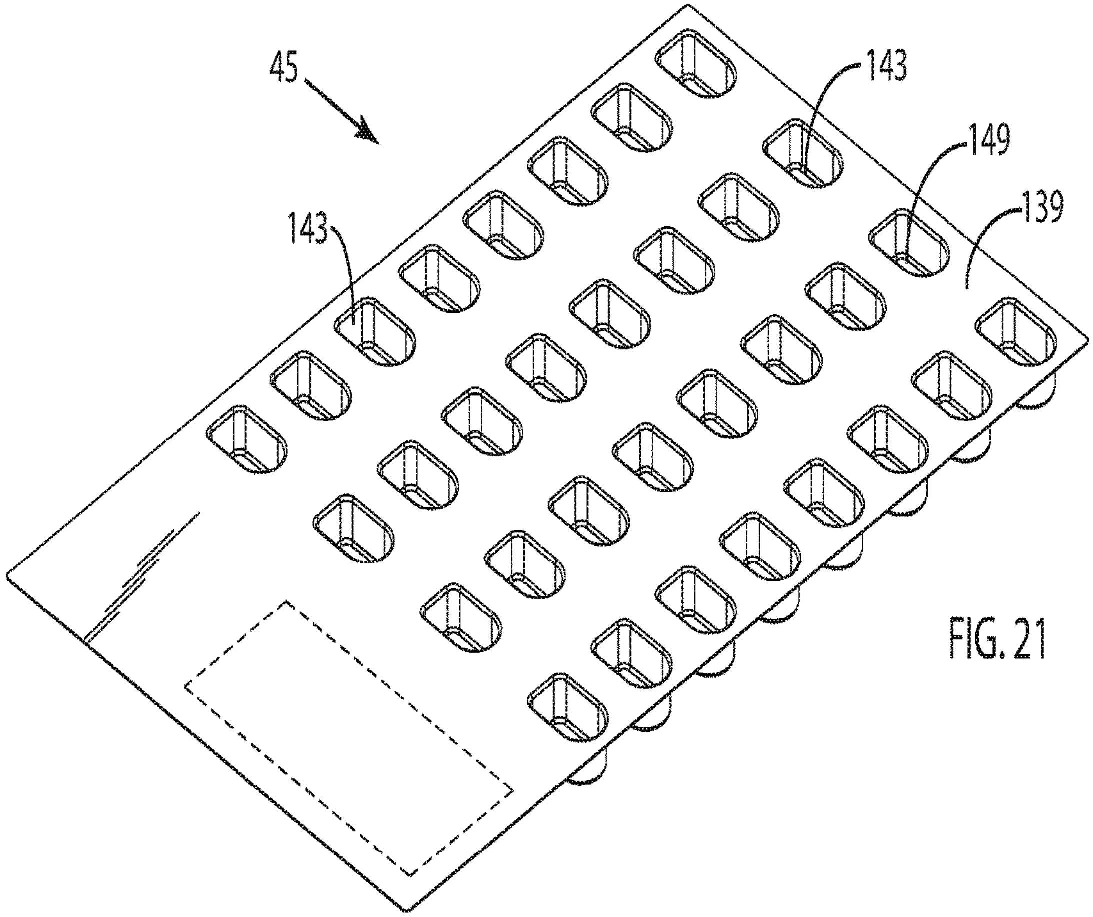
Figure 22:
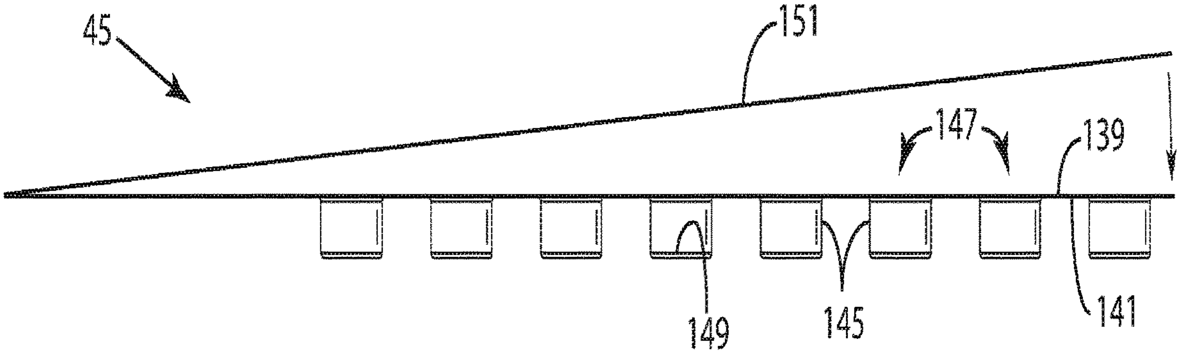

A representative blister package 45 embodiment which could be utilized with packaging system 10 is illustrated in FIGS. 20-22. Blister package 45 may include a top and a bottom side 139, 141 and cells, of which cell 143 is representative. Blister package 45 cells 143 are referred to by some in industry as "wells." Each cell 143 is defined by a cell wall, of which cell wall 145 is representative. Blister package 45 derives its name from the outwardly protruding appearance of the walls defining cells 143. For purposes of simplicity and brevity, each cell 143 of blister package 29 is indicated by reference number 143 and each cell wall 145 is indicated by reference number 145.

Referring again to FIGS. 20-22, each wall 145 defines a cell 143 upper opening, or inlet, 147 and a cell bottom 149. As shown in the example, the cell inlets 147 extend through, and are included in and along, top side 139. In the embodiment, medicaments 19 are loaded into each cell 143 through inlet 147 by means of blister package packaging unit 17 as described herein.

In the blister package 45 embodiment illustrated, each cell 143 is identical. However, it is possible that cells 143 and cell walls 145 of blister package 45 may have a structure which is not identical and which may differ depending on the needs of the user. For example, certain cells 143 of blister package 45 could have a depth or a cross-sectional shape which differs from the depth and cross-sectional shape of other cells of blister package 45.

Referring yet again to FIGS. 20-22, the blister package 45 example includes thirty two total cells 143 organized into four rows and eight columns of cells 143. The organization of cells 143 is merely exemplary. Cells 143 can be of any number and need not be arranged in rows and columns as illustrated. For example, cells 143 could be arranged in any number of rows and columns, in a circular pattern, or any other suitable arrangement. Blister package 45 may, by way of example only, be of a thin sheet of thermoformed or vacuum-formed transparent plastic of a polyvinyl chloride ("PVC") material. A transparent blister package 45 would permit packaged medicaments 19 to be viewable therein.

A closure 151 of paperboard, or of aluminum foil, or plastic may be placed over all of the cells 143 of a loaded blister package top side 139 to close blister package 45. The closed blister package 45 is then ready for delivery to the patient.

Certain blister package containers 45 are referred to as "push-through-packs." In a push-through-pack, the cell wall 145 material in which the cells 143 are formed is collapsible by pushing with a human finger. The seal provided by closure 151 is breakable so that the medicament 19 within the selected cell 143 can be pushed through the closure and out of blister package 45 for use.

Blister package 45 may be used as a compliance or multi-dose container by, for example, printing the days of the week above each cell 143 and arranging the medicaments 19 in cells 143 according to the order in which the medicaments 19 are to be taken by the patient. Such an arrangement ensures that the medicaments 19 can be taken by the patient one-after-another at the correct date and time. Blister package 45 could also be used as a unit-dose package with identical medicaments packaged therein.

Referring to FIGS. 1-5 and 8-16, a blister package packaging unit 17 may generally comprise a blister package delivery unit 153, an information application unit 155, a blister package conveyor 157, a robotic pick-and-place unit 159 and a sealer unit 161. The operating position of blister package packaging unit 17 refers to the state in which packaging system 10 is ready to function in the mode for packaging medicaments 19 in blister packages 45. In the example, blister package delivery unit 153 delivers an empty blister package 45 with information provided by information application unit 155 to blister package conveyor 157. Blister package conveyor 157 delivers the empty blister package 45 to robotic pick-and-place unit 159 for filling with medicaments 19. The cells 143 of the filled blister package 45 are closed and the blister package 45 sealed by attachment of a sheet of closure material 151 across the cells 143 by sealer unit 161.

A plural-position medicament diverter 163 may be provided to move medicaments 19 from automatic dispensing machine 11 to pouch packaging unit 17. In the example, diverter 163 may be extended into housing 47 to divert or change the direction of movement of medicaments 19 from a path which would be toward the pouch packaging unit 15 were it mounted in dispensing machine 11 and to a different path toward blister pack packaging unit 17. Diverter 163 may include a medicament conveyor 165 which delivers medicaments 19 to the blister pack packaging unit 17.

The diverter 163 embodiment will now be described in more detail in connection with FIGS. 1-5 and 8-16. In the example, diverter 163 may be located adjacent dispensing machine 11 housing 47 side wall 53. When not in an operational position or state, diverter 163 front end 167 may be adjacent and spaced from side wall 53. Removal of access panel 61 permits extension of diverter 163 front end 167 into and within housing 47 so as to position diverter 163 in the path of medicaments 19 falling from guide 95, thereby enabling the medicament 19 diversion.

In one embodiment, diverter 163 may include a frame 169 which supports diverter 163 on a floor surface and which enables movement of diverter 163 into the path of medicaments 19 falling from and exiting guide 95. Frame 169 may include a pair of fixed-position parallel elongate frame rails 171, 173 which lie in a horizontal plane and may further include pairs of vertical legs 175, 177, 179, 181 at opposite ends of frame rails 171, 173 to support frame rails 171, 173 and diverter 163 on a floor surface adjacent dispensing machine 11.

Riding on frame rails 171, 173 are a pair of sliding parallel elongate slide rails 183, 185 which slide (i.e., translate) in a horizontal plane alternatively in the directions of dual-headed arrow 187. Slide rails 183, 185 easily ride back-and-forth on a respective frame rail 171, 173 by means of rollers (not shown). Slide rails 183, 185 slide between a retracted position illustrated in FIGS. 1-5 and 8-10 and an extended position illustrated in FIGS. 12-16. A first latch 189 may secure and lock slide rails 183, 185 in either the extended position or the retracted position. Handle 191 may be grasped and turned to release or engage first latch 189.

Medicament conveyor 165 may ride on slide rails 183, 185 which may be components of diverter 163 frame 169. Medicament conveyor 165 may be supported within a pair of parallel elongate side walls 195, 197 which slide (i.e., translate) in a horizontal plane alternatively in the directions of dual-headed arrow 187. Side walls 195, 197 easily ride back-and-forth on a respective slide rail 183, 185 by means of rollers (not shown). Side walls 195, 197 and slide rails 183, 185 slide between the retracted position illustrated in FIGS. 1-5 and 8-10 and the extended position illustrated in FIGS. 12-16. A second latch 199 may secure side walls 195, 197 in either the extended position or the retracted position. Handle 201 may be grasped and turned to release second latch 199. Medicament conveyor 165 may be moved laterally in a telescoping manner to position medicament conveyor 165 under guide 95 to receive medicaments 19 falling from guide 95 bottom opening 101. In the example, sliding of slide rails 183, 185 and side walls 195, 197 may be accomplished by manual pushing or pulling after release of latches 189, 199.

Side walls 195, 197 of medicament conveyor 165 may also support a front idler roller 203, a rear driven roller 205 and an endless belt 207 supported on rollers 203, 205 between side walls 195, 197. An electric motor 209 may be in power-transmission relationship with rear driven roller 205 to power movement of belt 207 in the rearward direction of arrow 275. Motor 209 and stepwise movement of belt 207 may be controlled by controller 12 (FIG. 17) which controls overall operation of packaging system 10. A sensor or any appropriate control may be used to stop and start motor 209 for each step.

Referring next to FIGS. 12, 14-16, belt 207 may support a plurality of carriers 211, 212, 213, 214, 215, 216, 217, 218, 219, 221. Each carrier 211-221 is provided to hold medicaments 19 dispensed from medicament dispensing unit 13 while diverter 163 transports such medicaments 19 to blister package packaging unit 17. To accomplish this, each carrier 211-222 may be attached to belt 207 in a manner permitting carrier 211-222 to be upside down on belt 207 without falling off belt 207. Indexed or stepwise movement of belt 207 driven by motor 209 in the direction of arrow 275 positions one carrier 211-222 under bottom opening 101 of guide 95 during each step. Carriers 211-222 may each include a bowl 224. Bowl 224 may include a rim for holding medicaments 19 which fall from guide 95 into a carrier 211-222 when the carrier 211-222 is positioned under guide 95 bottom opening 101. A carrier 211-222 loaded with one or more medicament 19 may then be moved by belt 207 to blister package packaging unit 17 for transfer and packaging of medicaments 19 into a cell or cells 143 of blister package 45. Therefore, diverter 163 redirects movement of medicaments 19 toward blister package packaging unit 17.

Any quantity of medicaments 19 required for loading a blister package 45 may be loaded into a carrier 211-222 by medicament dispensing unit 13. For example, if blister package 45 were to have 32 cells 143 and each cell 143 were to require one identical medicament 19 to fulfil the prescription order, then 32 identical medicaments 19 could be output from the storage and dispensing unit(s) 69 holding such medicament 19 and loaded into a single carrier 211-222 for delivery to the robotic pick-and-place unit 159. Further, if different types of medicaments 19 are to be loaded into a single blister package 45, then the required quantity of each type of medicament 19 may be loaded into separate carriers 211-222 and each carrier may be delivered to the robotic pick-and-place unit 159 so that each medicament 19 can be loaded into a blister package 45.

Referring next to FIGS. 4-5 and 15-16, an imager 223 may be provided to capture an image record of the medicament contents of each carrier 211-222 before packaging of the medicaments 19 into a blister package 45 by robotic pick-and-place unit 159. Imager 223 may capture an image of the quantity, color, size, shape and other physical characteristics of medicaments 19 in carrier (e.g., carrier 211). The video image may be stored in the file associated with computer 12 for the blister package 45. Computer 12 may inspect the video image for a match (i.e., pass/fail) with the medicament count and type expected to be in the carrier (e.g., carrier 211) as stored in the file. If there is a match, then a record may be kept in the file for the blister package 45. If there is no match, then an alarm may be generated so that the technician can correct the mismatch error. System 10 may be momentarily stopped by controller 12 for this error correction. The image record may be used to keep an archive in a database associated with controller 12, indicative that the correct medicament 19 for the blister package 45 was supplied in accordance with the file information for the blister package 45. Imager 223 may be a second control to ensure that the correct quantity and type of medicaments 19 have been dispensed.

Imager 223 may include a housing 225 and an imaging device 227. Housing 225 may be an enclosure which may be positioned over one carrier (e.g., carrier 211) to cover carrier 211 while belt 207 is momentarily stopped by controller 12. Imager 223 may be supported above belt 207 and carriers 211-222 by a cover 230. In addition to supporting imager 223, cover 230 can prevent medicaments 19 from bouncing out of a carrier 211-222 during transport on medicament conveyor 165. And, cover 230 can protect medicaments 19 from contact by contaminants. Cover 230 may be raised or lowered to space imager 223 above a carrier 211-222 as desired to produce the required image of medicaments 19 in a carrier 211-222.

Imaging device 227 may be supported on housing 225 to capture an image of medicaments 19 in bowl 224 of carrier 211. Imaging device 227 may be a charged coupled device ("CCD"). A preferred CCD captures light and converts it to digital data that is stored through processing in each file for each blister package 45 by controller 12. It is preferred that imaging device 227 has a resolution of about 8 megapixels or greater. A dome-like lamp 229 may be provided within housing 225 to illuminate medicaments 19 for image capture by imaging device 227.

Controller 12 may power motor 209 to momentarily power belt 207 back-and-forth alternatively in the directions of arrow 187. Back-and-forth movement of belt 207 may serve to shake medicaments 19 within a carrier 211-222 so as to avoid stacking of medicaments 19 and to ensure medicaments are uniformly spread out within a carrier 211-222 so as to provide for more accurate imaging of such medicaments 19.

Referring next to FIGS. 1-5 and 8-16, components of one embodiment of a blister package packaging unit 17 will now be described. Components of blister package packaging unit 17 may include blister package delivery unit 153, information application unit 155, blister package conveyor 157, robotic pick and place unit 159 and sealer unit 161. All of these components may be controlled by controller 12.

In the example, bin 231 may be provided as a storage location for a source of empty blister packages 45. Bin 231 may hold a stack of empty blister packages 45 nested one on top of the other in bin 231.

Figure 14:
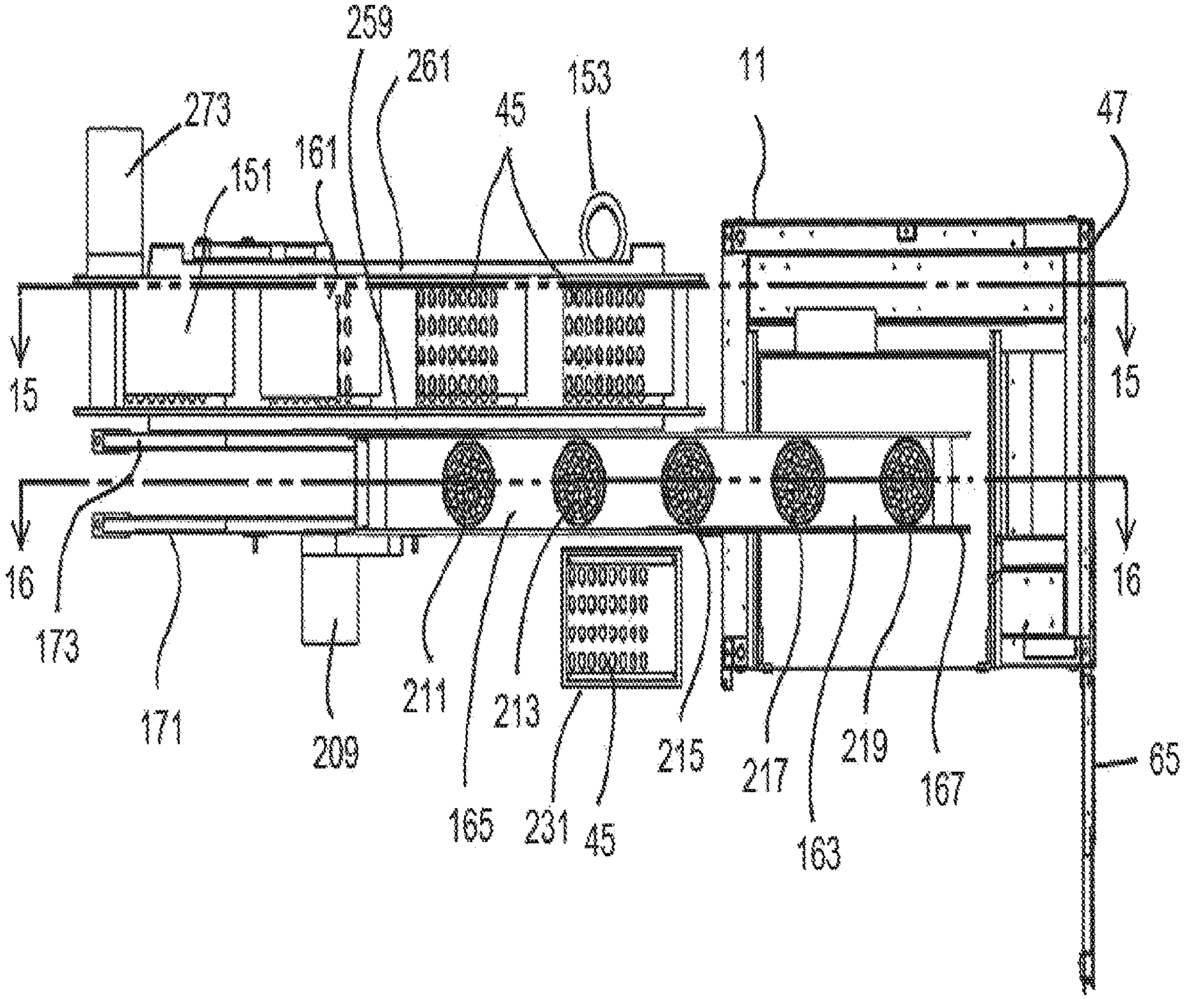
FIG. 14 is a section view of the packaging system taken along section 14-14 of FIG. 13 with certain components removed to facilitate understanding.
Figure 14A:
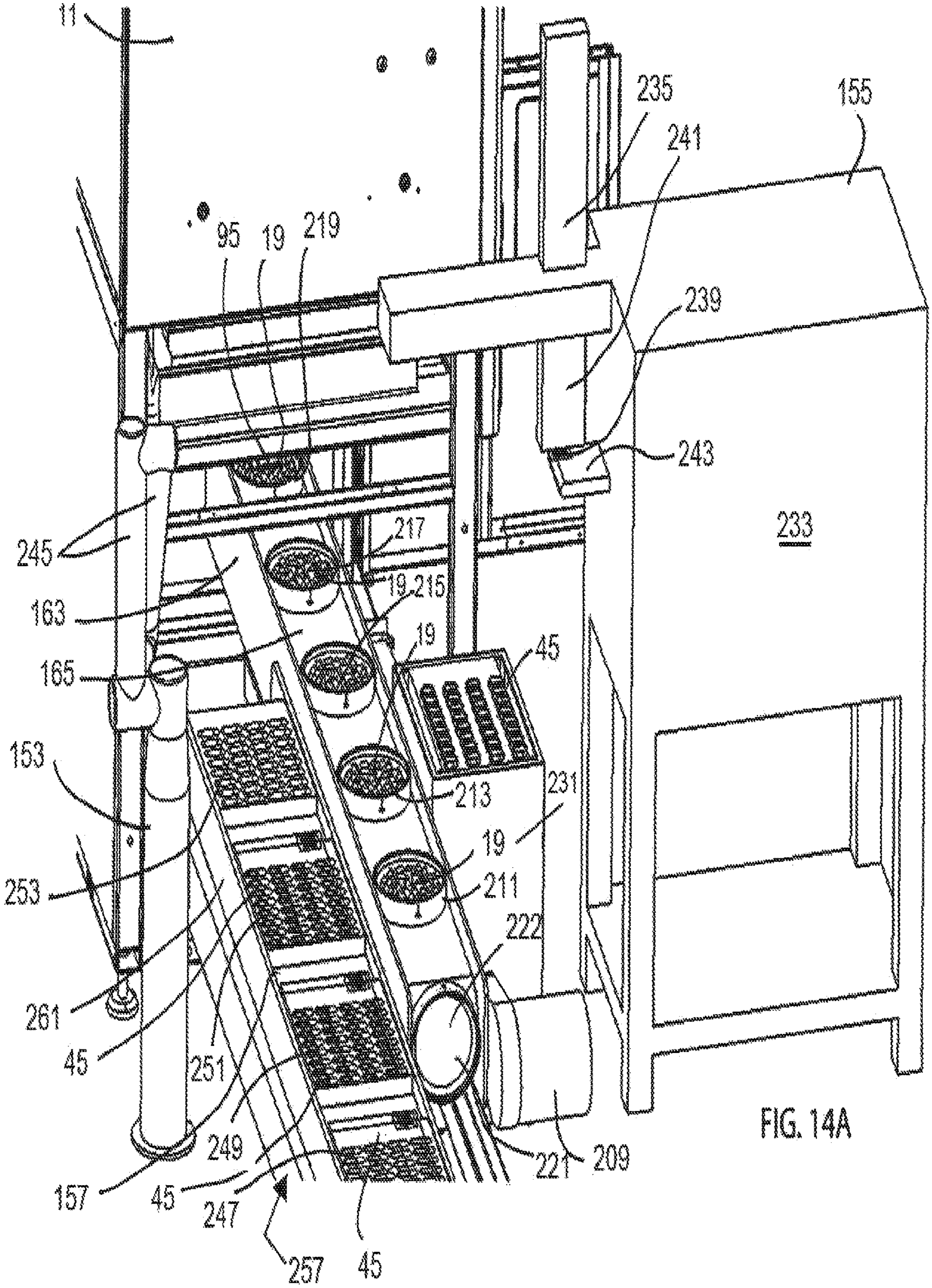
FIGS. 14A-14G are perspective views illustrating manipulation of a blister package with certain components removed to facilitate understanding.
Figure 14B:
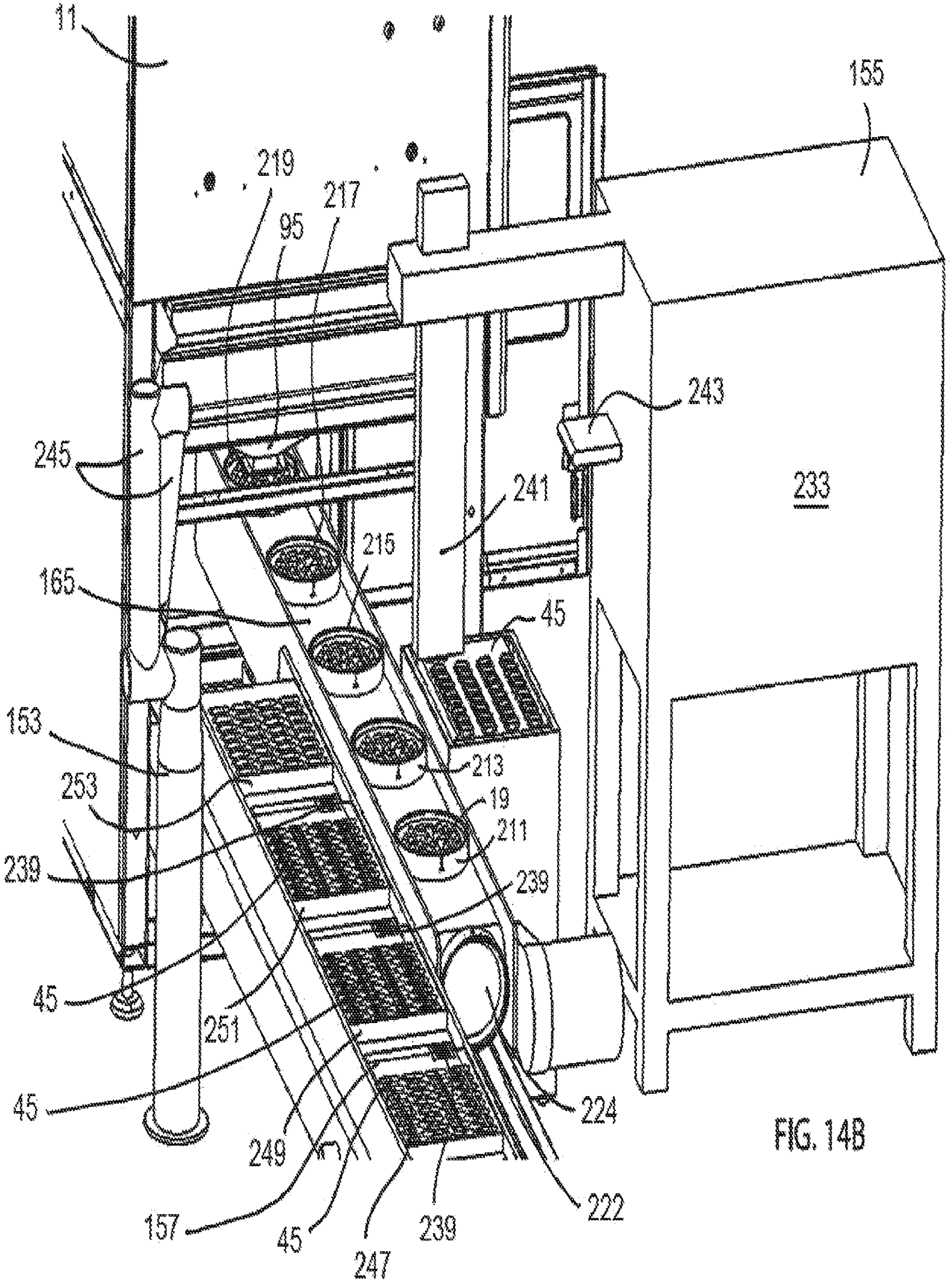
Figure 14C:
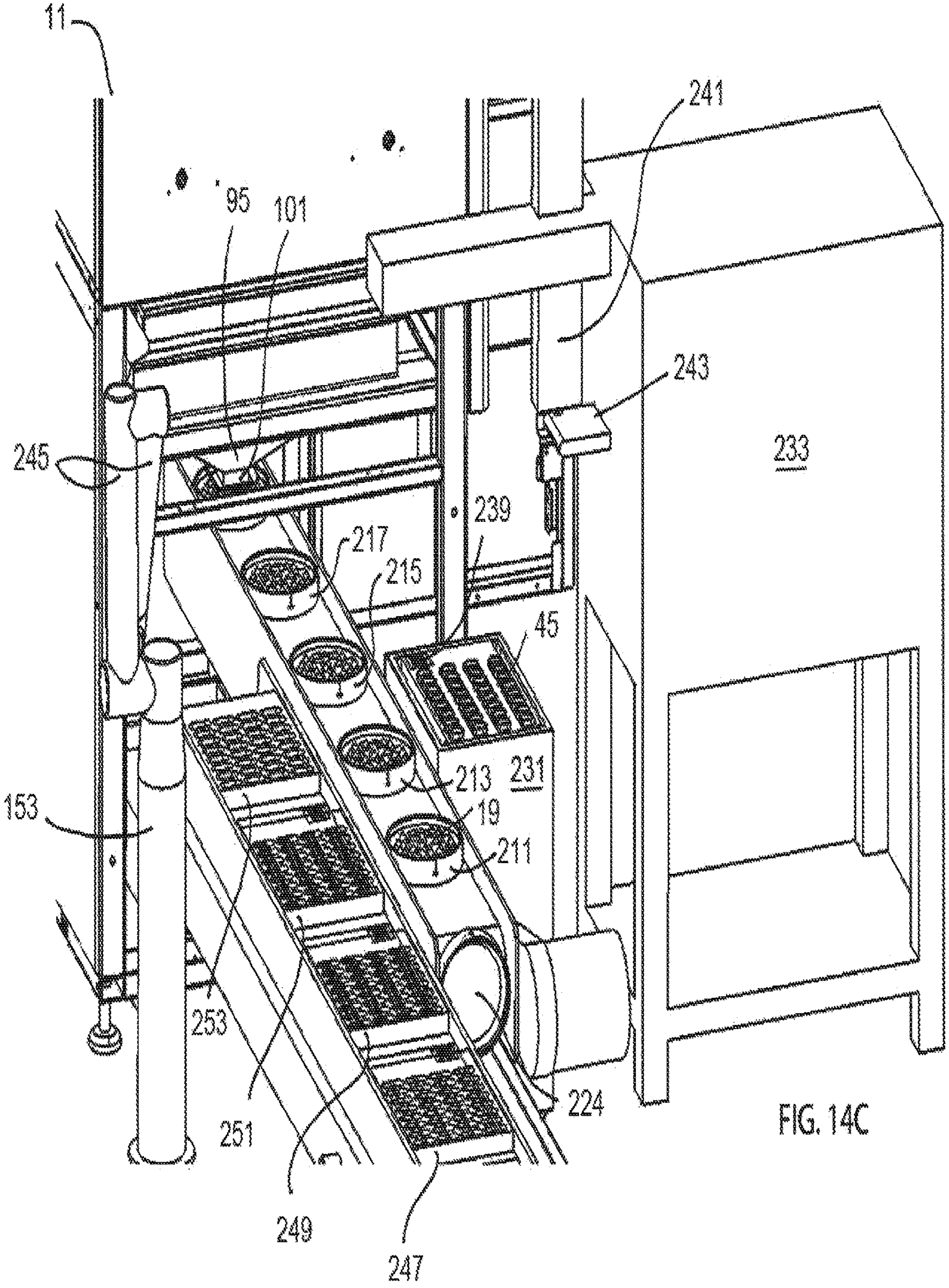

Referring to FIGS. 14A-14C, information application unit 155 may include a label printer 233 and a transport mechanism 235. Information application unit 155 may be provided to apply information 237 to each empty blister package 45 describing the medicaments 19 which will be packaged in each such blister package 45. It is not required that information application unit 155 apply information 237 to each empty blister package. For example, a unit dose blister package 45 not intended for a specific patient may not need application of information 237. If applied, information 237 may include patient-specific information 237 from the file associated with controller 12 for the blister package 45. The information 237 may include all information necessary for dispensing of each medicament 19 packaged in the blister package 45 including patient name, physician name, medicament type and strength, medicament lot number and any other pertinent information.

In the example, label printer 233 may include any suitable printer which affixes the information 237 to an adhesive-backed label 239. In the example, label printer 233 may output the adhesive-backed label 239 for a blister package 45 onto platform 241.

Transport mechanism 235 may include an arm 241 which may be moved in an x-y coordinate system. Transport mechanism 235 may include a vacuum source (not shown) which utilizes a negative pressure to momentarily adhere arm 241 to label 239 on platform 243 and may press and affix the label 239 to the topmost empty blister package 45 from the blister package 45 stack in bin 231 as illustrated in FIG. 14C.

Figure 14D:
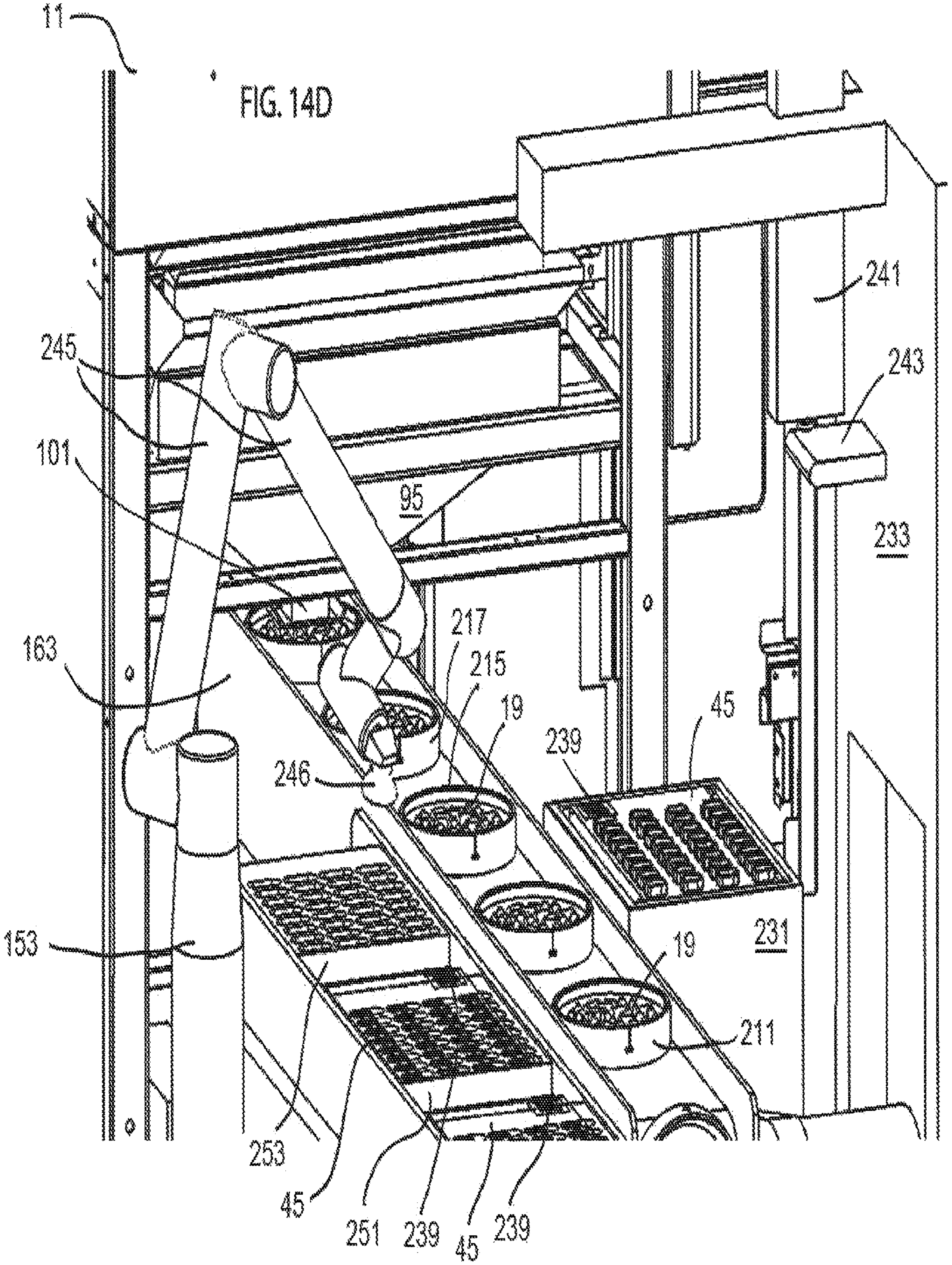
Figure 14E:
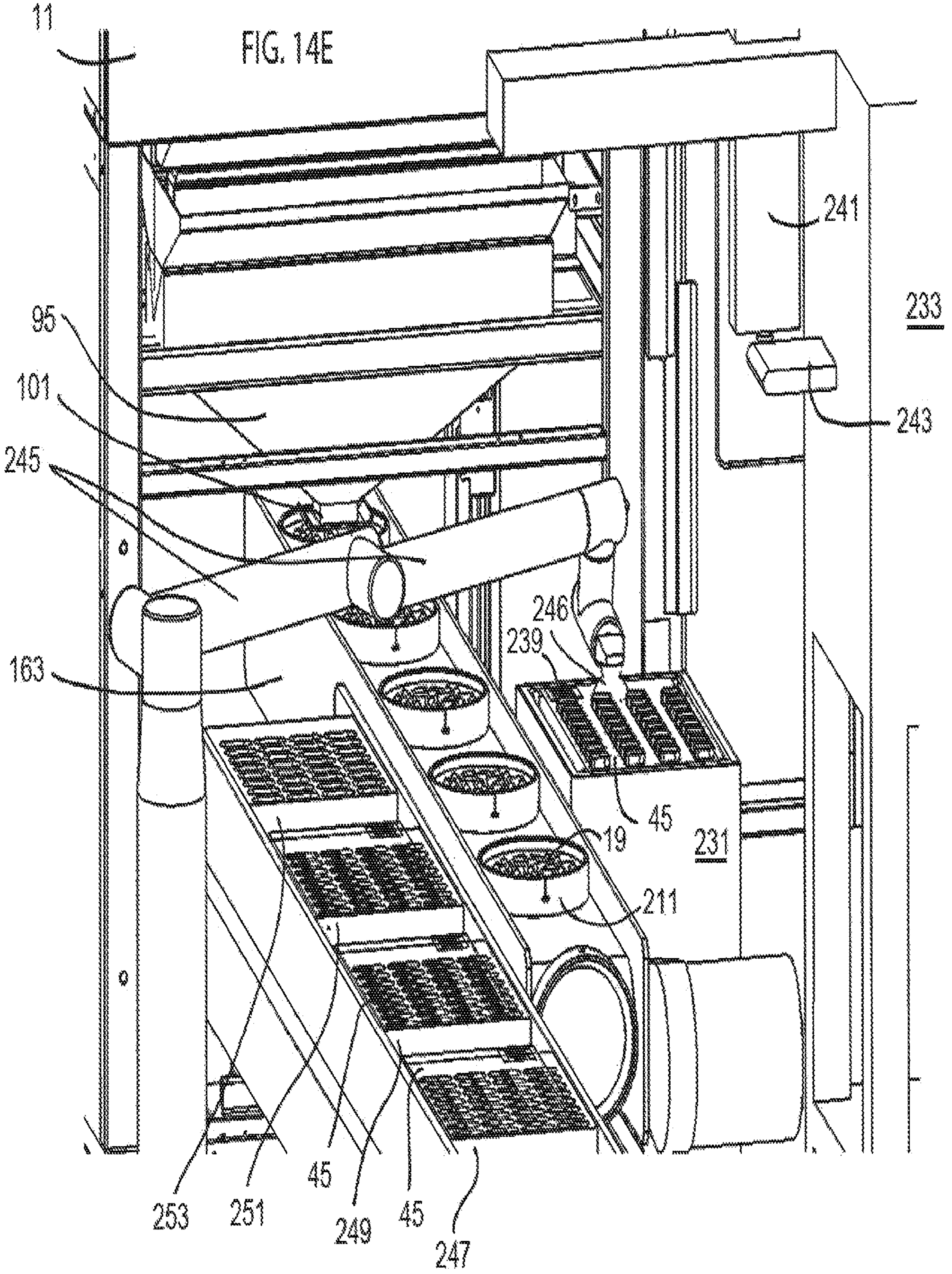

Referring next to FIGS. 14D-14G, blister package delivery unit 153 may be a robot controlled by controller 12 provided to move the empty and labeled blister package 45 from the stack of blister packages 45 in bin 231 adjacent information application unit 155 and to and onto blister package conveyor 157. Such robot may include an articulated arm 245 which may be moved in an x-y-z coordinate system. A gripper 246 may be carried at an end of arm 245. Blister package delivery unit 153 may include a vacuum source (not shown) which utilizes a negative pressure to momentarily adhere gripper 246 to the topmost labeled empty blister package 45 from the blister package 45 stack in bin 231. As illustrated in FIGS. 14D and 14E, arm 238 may be moved from a start position (FIG. 14D) to a further position in which to gripper 246 contacts and grips the blister package 45 (FIG. 14E). Gripping may occur by generation of the vacuum.

Figure 14F:
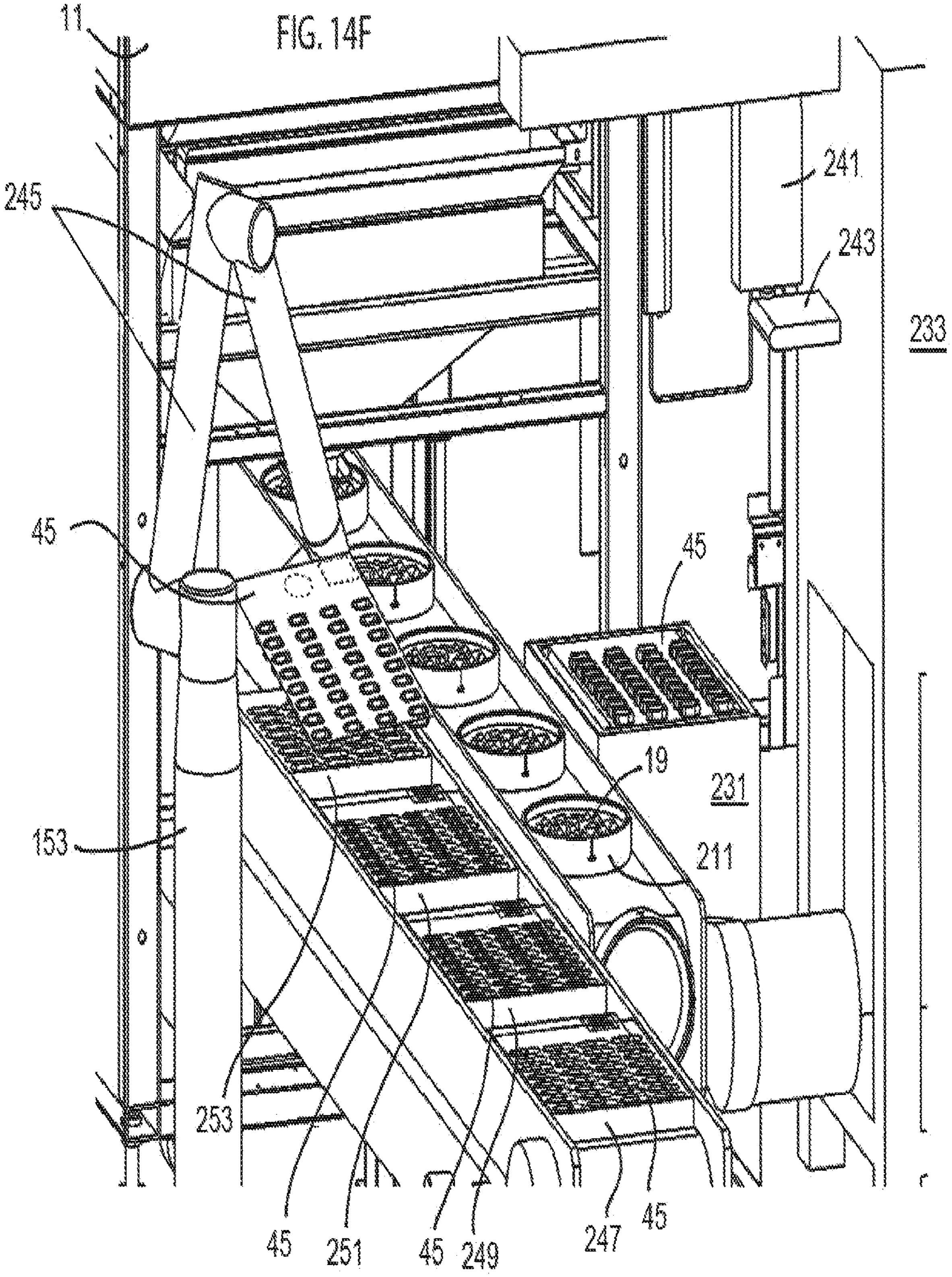
Figure 14G:
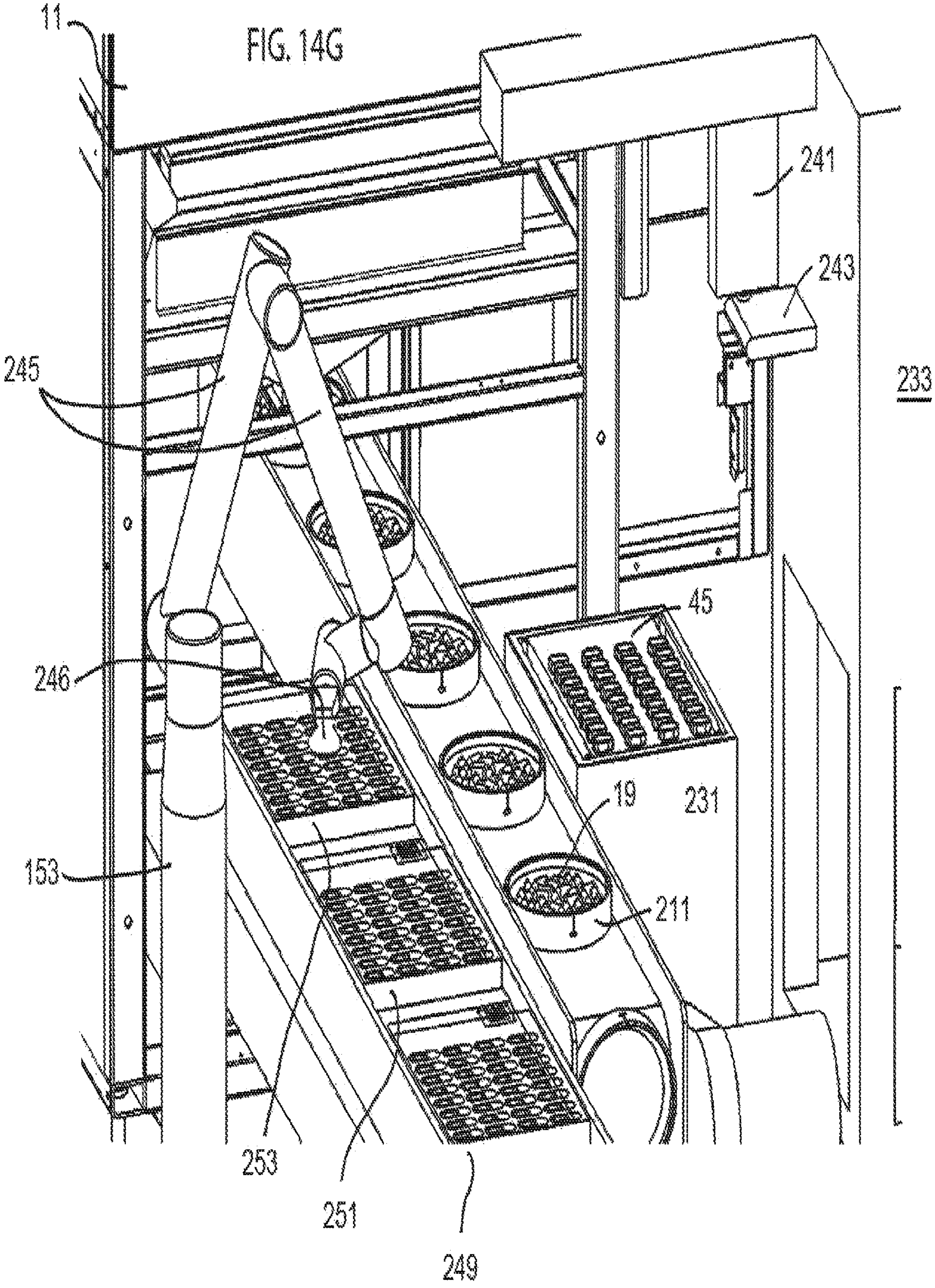
Figure 15:
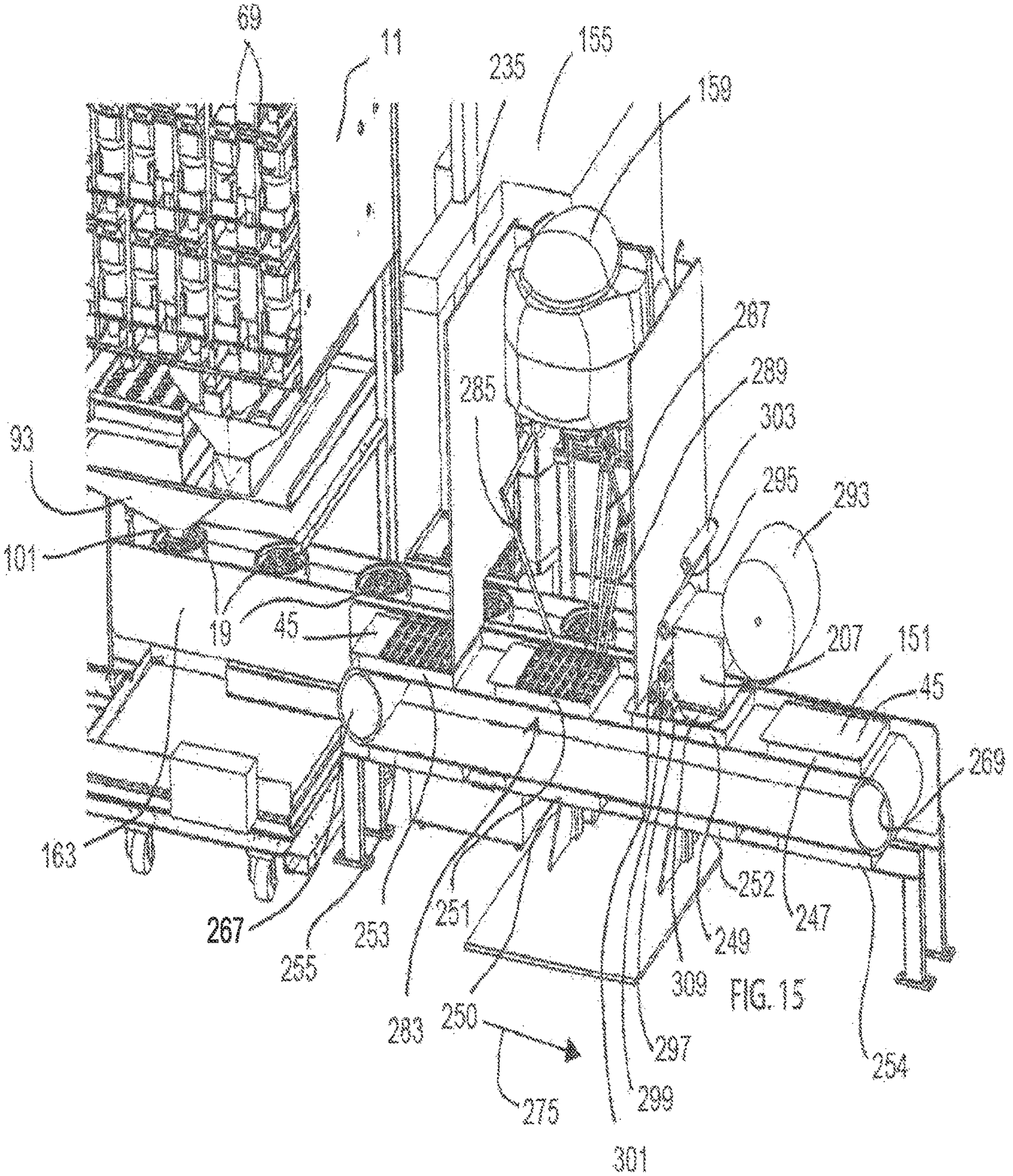
FIG. 15 is a section view in perspective of the packaging system taken along section 15-15 of FIG. 14.
Figure 15A:
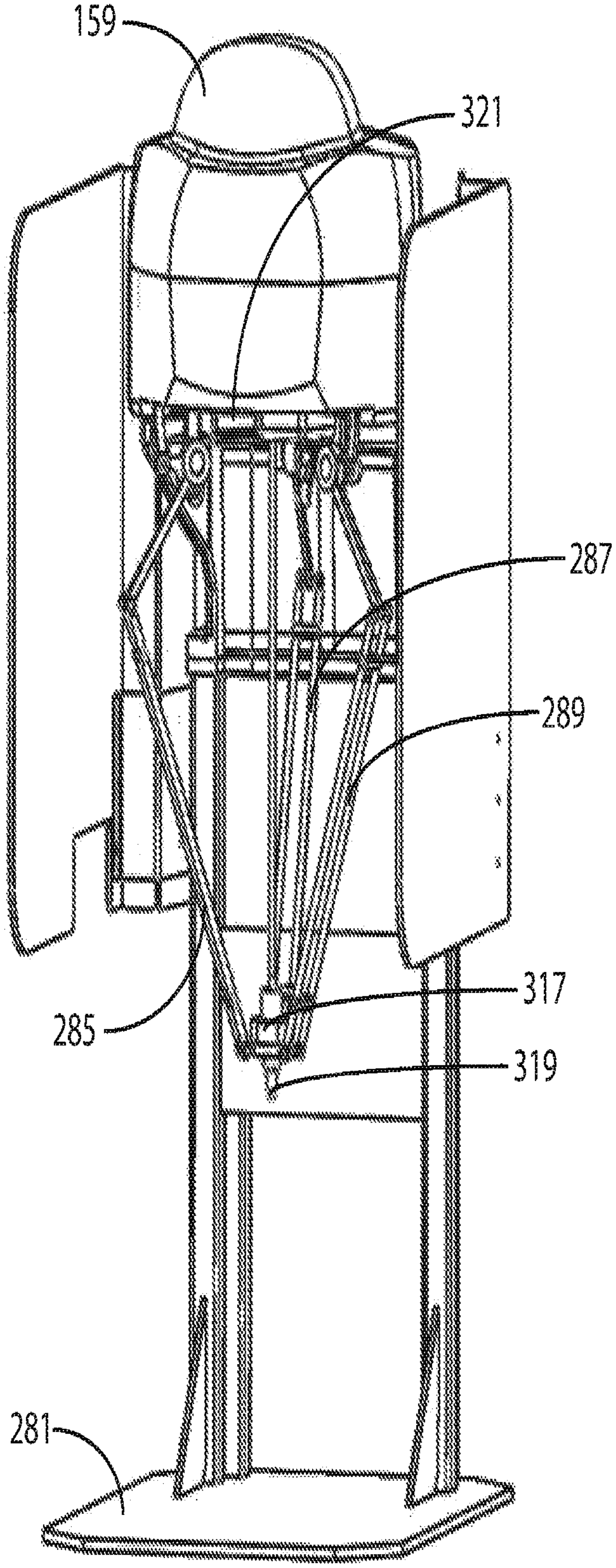
FIGS. 15A and 15B are perspective views of an embodiment of a robotic pick-and-place unit.
Figure 15B:
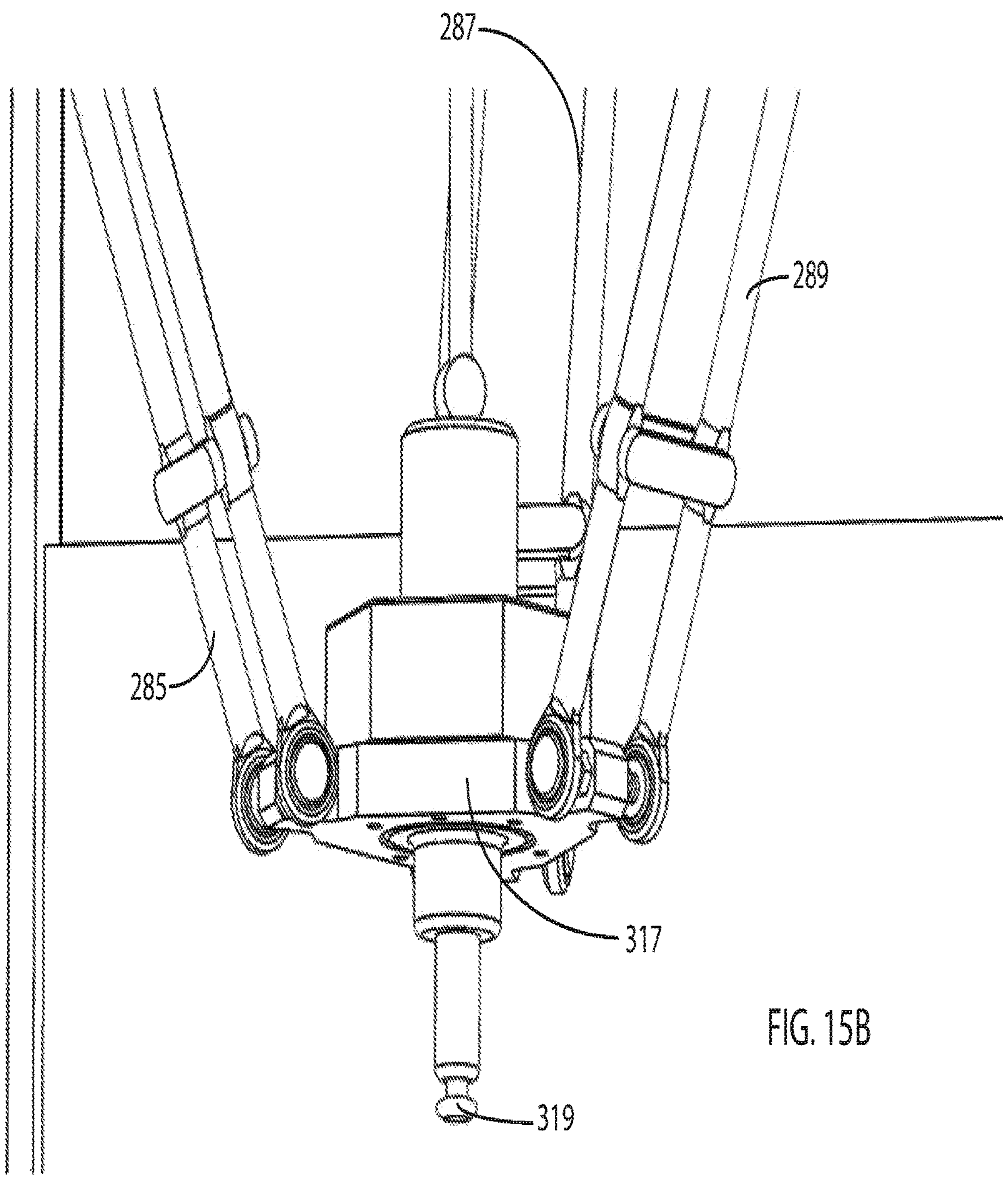
Figure 16:
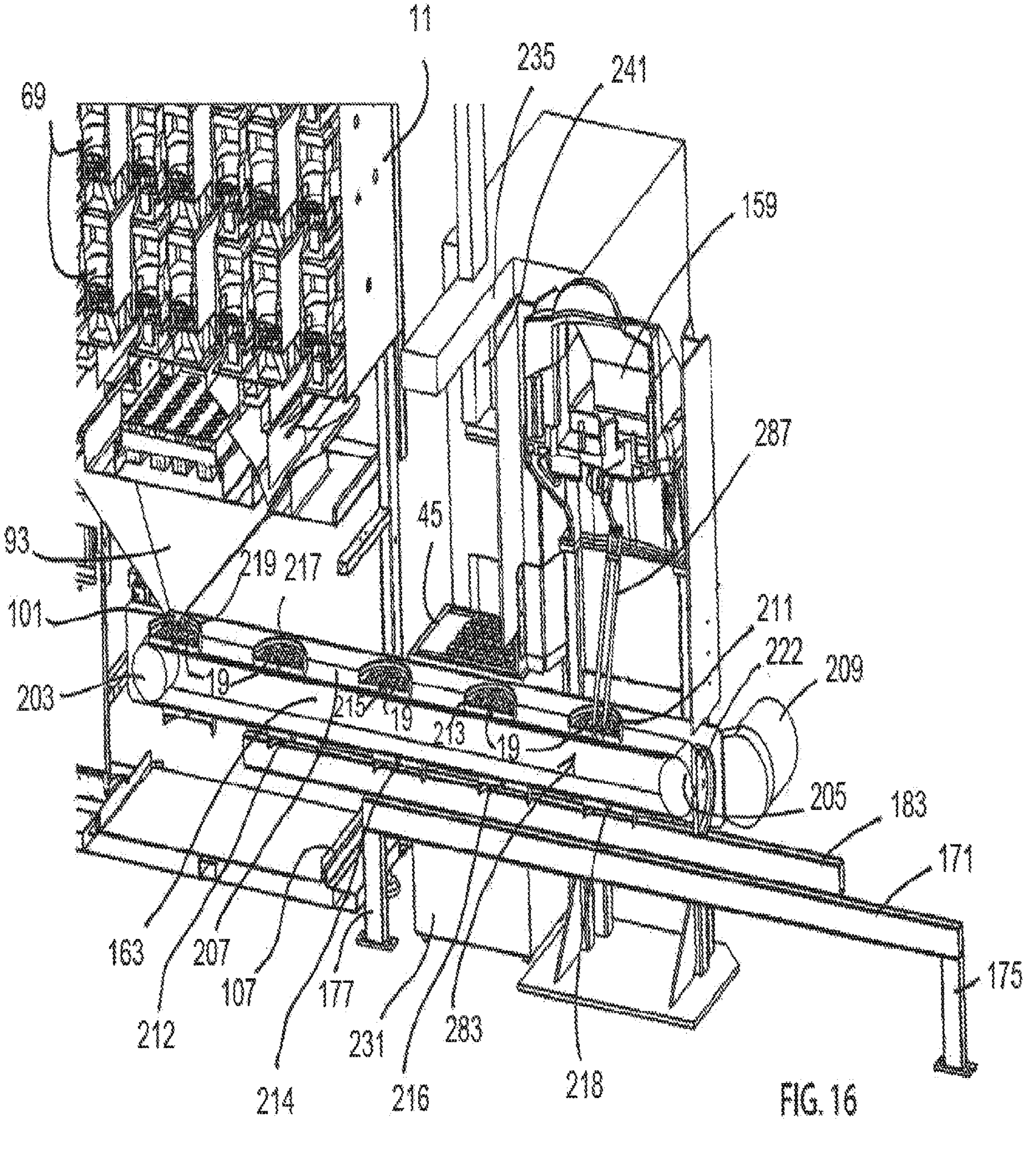
FIG. 16 is a section view in perspective of the packaging system taken along section 16-16 of FIG. 14.
Figure 17:
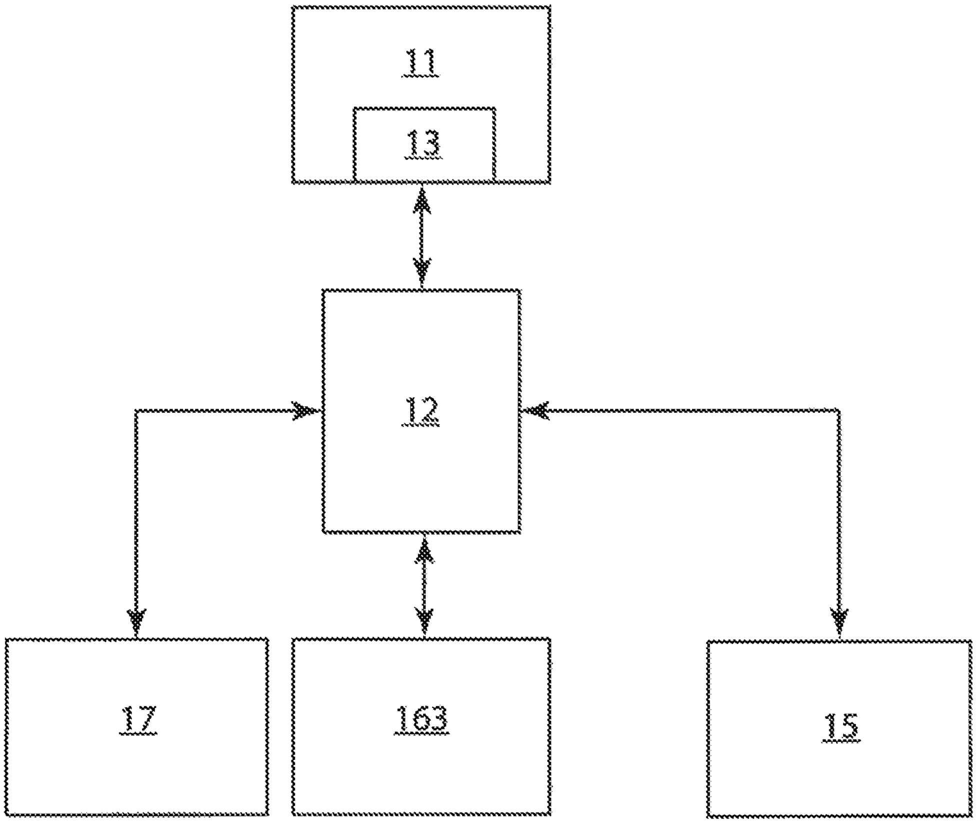
FIG. 17 is a block diagram illustrating components of a control system for the packaging system of FIG. 1.

As illustrated in the sequence of FIGS. 14F-14G, arm 245 may then lift the gripped blister package 45 as illustrated in FIG. 14E, flip the gripped blister package 45 as illustrated in FIG. 14F, and place the blister package 45 onto one blister package holder 247, 249, 250, 251, 252, 253, 254, 255 on blister package conveyor 157 as illustrated in FIG. 14G. Arm 245 may then gently push blister package 45 down onto a holder (e.g., holder 247) so that blister package 45 nests onto such holder with cells 143 in positions known to controller 12 as described next. Arm 245 may then return to the position of FIG. 14A to begin another cycle.

Blister package conveyor 157 may include a frame 257 including a pair of parallel elongate side walls 259, 261. Frame 257 may be supported on a floor surface by attachment of sidewall 259 to frame rail 173 of diverter 163 frame 169 and by vertical legs 263, 265. In the embodiment, blister package conveyor 157 and medicament conveyor 165 may be parallel to each other.

Frame 257 of blister package conveyor 157 may also support a front idler roller 267, a rear driven roller 269 and an endless (i.e., continuous) flexible belt 271 supported on rollers 267, 269. An electric motor 273 may be in power-transmission relationship with rear driven roller 269 to power rearward movement of belt 271 in an indexed or stepwise manner in the direction of arrow 275. Motor 273 may be controlled by computer 12 which controls overall operation of packaging system 10. A sensor or any appropriate control may be used to stop and start motor 273 for each step.

Referring next to FIGS. 1, 3-4, 9-12 and 14-16, belt 271 may support a plurality of blister package holders 247-255 which may have a structure each identical to the other. Each holder 247-255 may be attached to belt 271 in a manner permitting holder 247-255 to be upside down on belt 271 without falling off belt 271 allowing belt 271 to be driven entirely around rollers 267, 269 in the direction of arrow 275. Each holder 247-255 may be provided to receive an empty labeled blister package 45 from transport mechanism 235, to hold the labeled blister package 45 during loading of medicaments 19 into cells 143 by robotic pick-and-place unit 159, to hold the loaded and labeled blister package 45 during sealing by sealer unit 161 and to tip so that the sealed blister package 45 can be ejected from the holder 247-255.

Each holder 247-255 may define a top surface 277 and a plurality of concave pockets 279 which may be arranged in a shape and pattern identical to the arrangement of cells 143 of blister package 45 so that a blister package 45 can be nested on any holder 247-255. For example, if blister package 45 includes thirty two total cells 143 organized into four rows and eight columns of cells 143, then each holder 247-255 may have a pattern of pockets 279 identical to the pattern of the blister package cells 143 and cell walls 145 defining cells 143. The location of each pocket 279 may be known to controller 12.

Blister package 45 may be set on a holder 247-255 by arm 238 with each cell 143 nested in a corresponding pocket 279. This arrangement enables each cell 143 location to be identified by computer 12 which controls operation of packaging system 10 for purposes of precisely loading any medicament 19 into any desired cell 143 of a labeled blister package 45 by robotic pick-and-place unit 159.

Rearward indexed or stepwise movement of belt 271 in the direction of arrow 275 delivers a holder 247-255 and an empty labeled blister package 45 nested thereon to robotic pick-and-place unit 159 for filling with medicaments 19 as described next.

In one embodiment, a robotic pick-and-place unit 159 may be a floor mounted unit supported on a floor stand 281. Stand 281 may support robotic pick-and-place unit 159 above and straddling both the parallel blister package conveyor 157 and medicament conveyor 165 with robotic pick-and-place unit above conveyor belt 207 of blister package conveyor 157 and conveyor belt 271 of medicament conveyor 165. Robotic pick-and-place unit 159 may be under control of computer 12 which controls operation of packaging system 10. In the example, robotic pick-and-place unit 159 may be capable of picking a medicament 19 from a carrier 211-222 and placing the medicament 19 into any cell 143 as specified by instructions associated with controller 12 for the blister package 45.

A supply of medicaments 19 and an empty labeled blister package 45 may be delivered to robotic pick-and-place unit 159 for loading of each medicament 19 into the required cell 143 of blister package 45. Imaging of medicaments 19 in carrier 211-222 may occur before delivery of carrier 211-222 to robotic pick-and-place unit 159 as described above.

In the exemplary embodiment, the blister package loading process may be as follows. A carrier 211-222 on belt 271 with one or more medicament 19 in bowl 224 may be delivered by medicament conveyor 165 to a loading station 283 adjacent to and preferably beneath robotic pick-and-place unit 159. A carrier 211-222 at loading station 283 is referred to herein as being at a "delivery position" at which medicaments can be transferred to a blister package 45. Belt 271 may be stopped with one carrier 211-222 at loading station 283. Because of the indexed stepwise movement of belt 271 and carriers 211-222 thereon, each carrier 211-222 is identified to packaging system 10. A sensor or any appropriate control may be used to stop and start motor 273 for each step.

Simultaneously, a holder 247-255 holding an empty labeled blister package 45 may be delivered in an indexed manner by blister package conveyor 157 to loading station 283 whereupon belt 271 may be stopped with one holder 247-255 at loading station 283. The indexed stepwise movement of belt 271 and holder 247-255 thereon permits each cell 143 position to be identified to packaging system 10. By identification, it is meant that packaging system 10 may have a record of both each cell 143 location (e.g., row 1, column 1 of blister package 45) and of each medicament 19 that is required to be loaded in each cell 143 location. Consequently, a carrier 211-222 containing medicaments 19 and a blister package 45 to be loaded with the medicaments 19 are both at loading station 283 for transfer of medicaments to blister package 45 by robotic pick-and-place unit 159.

Robotic pick-and-place unit 159 may be any device capable of loading medicaments 19 into the labeled blister package 45 at loading station 283. One example of a device which may be utilized as robotic pick-and-place unit 159 is a Fanuc robot M-1iA/1HL available from Fanuc America Corporation of Hoffman Estates, Ill. Such Fanuc robot may include three computer-controlled 12 articulated 285, 287, 289 arms. Arms 285, 287, 289 of robotic pick-and-place unit 159, may be interconnected to hold a single control head 317 toward the ends of such arms 285-289. Control head 317 may have a probe end 319 connected to a vacuum source (not shown). The vacuum source permits probe end 319 to pick and hold a medicament 19 from carrier (e.g., 211) for transport to blister package 45.

Under control of computer 12, each arm 285-289 can be coordinated to move control head 317 toward carrier 211-222 at loading station 283 to allow probe end 319 to grip or "pick" one medicament 19 in bowl 224. Negative pressure from the vacuum mechanism at probe end 319 momentarily grips a medicament 19. Arms 285-289 are then moved to move control head 317 to the appropriate cell 143 of labeled blister package 45 also at loading station 283. A momentary cessation of the vacuum at probe end 319 causes control head 317 to drop or "place" a medicament 19 into a specified cell 143.

The combination of all three arms 285-289 and their individual motion, control the location of control head 317 and probe end 319 in a controlled range of motion. The combination of the arms 285-289, control head 317, and a video camera 321 give the robotic pick-and-place unit 159 the ability to locate the desired medicament 19 to be picked and the location and orientation of the cell 143 into which the medicament 19 will be placed. This video image may be taken for each picking cycle of the robotic pick-and-place unit 159 to insure target medicaments 19 and cells 143 have not been moved during the last cycle of arms 285-289. The control head 317 may have a 360 degree rotary control axis that allows the robotic pick-and-place unit 159 to control the orientation of the medicament 19 should it have a larger profile (e.g., an elongate oval tablet) which needs manipulation to fit through cell inlet 147.

Video camera 321 may capture an image of the quantity, color, size, shape and other physical characteristics of medicaments 19 in carrier (e.g., carrier 211). The video image may be stored in the file associated with computer 12 for the blister package 45. Computer 12 may inspect the video image for a match (i.e., pass/fail) with the medicament count and type expected to be in the carrier (e.g., carrier 211) as stored in the file. If there is a match, then a record may be kept in the file for the blister package 45. If there is no match, then an alarm may be generated so that the technician can correct the mismatch error. System 10 may be momentarily stopped by controller 12 for this error correction.

In the example, packaging system 10 may provide three checks of medicaments 19 before loading in a blister package 45. A first check may occur when a count is generated by counter 84. A second check may occur based on analysis of the image captured by imager 223. A third check may occur based on analysis of the image captured by video camera 321 of robotic pick-and-place unit 159.

Robotic pick-and-place unit 159 may have the capability to place any medicament 19 in any cell 143 of blister package 45 as required for fulfillment of the prescription order associated with the blister package 45. For example, if different types of medicaments, such as medicaments 19 and 21 (FIG. 19), are to be loaded in a single blister package 45, then first single-type medicaments 19 from a first carrier 211 could be loaded in the required cells 143 in any required sequence, including by potentially skipping cells 143 in which a different type medicament 21 is to be loaded.

Next, a second carrier 213 with a second and different type of medicament 21 could be delivered by medicament conveyor 165 to loading station 283 while the partially-loaded blister package 45 remains stopped at loading station 283. The second type of medicament 21 could then be loaded in the required cells 143 for that medicament 21, once again in any required sequence potentially skipping cells 143 in which a further different type medicament 23 is to be loaded. The process is continued until all cells 143 of a single blister package 45 are loaded with a medicament (e.g., medicament 19, 21, 23) as required by the patient's prescription order.

The foregoing process enables a single blister package 45 to be loaded with an identical type of medicament 19 or with different types of medicaments 19, 21, 23 in, for example, the order in which the medicaments 19, 21, 23 are to be taken by the patient. As an example, three different medicaments 19, 21, 23 to be taken serially at different times of the day (e.g., breakfast, lunch and dinner) could be loaded in three consecutive cells 143 to be taken one after the other by the patient.

Following loading of blister package 45, belt 271 of blister package conveyor 157 may be restarted permitting further rearward indexed movement of belt 271 in the direction of arrow 275. Such movement delivers the next empty blister package 45 to be loaded and holder 247-255 in which the blister package 45 is nested to loading station 283. Such movement further delivers the loaded blister package 45 and holder 247-255 in which blister package 45 is nested to the sealer unit 161 for sealing of blister package 45 as described next.

Any number or size of robotic pick-and-place units 159 may be utilized as the packaging system 10 may be scaled to meet the needs of the pharmacy. Robotic pick-and-place unit 159 is intended to be an example.

Referring now to FIGS. 1-5 and 9-15, sealer unit 161 may be provided to seal blister package 45 and the medicaments 19 loaded therein. Sealer unit 161 may be controlled directly or indirectly by controller 12. Sealer unit 161 may be provided to close and seal each filled and loaded blister package 45 by attachment of a closure 151 across the cells 143. In the example, sealer unit 161 may also print information on closure 151 to assist the patient in taking medicaments 19 packaged in blister package 45.

Sealer unit 161 may include a supply roll 293 including a web 295 of a carrier or backing material and a plurality of die-cut closures 151 supported on the carrier web 295. Each closure 151 may, for example, be a of a thin sheet of paperboard, aluminum foil or plastic material and may include a thin layer of adhesive (not shown) on a side which will face top side 139 of blister package 45. Closure 151 may be of a material type which can be easily broken by a patient pushing on cell bottom 149 so as to provide a "push-through-pack" as previously described.

Web carrier 295 carrying closures 151 may be unwound from roll 293 through a series of idler rollers 297, 299, 301 and onto a take-up roller 303 driven by take-up roller motor 305. Web carrier 295 wound onto take-up roller 303 may subsequently be discarded.

Figure 13:
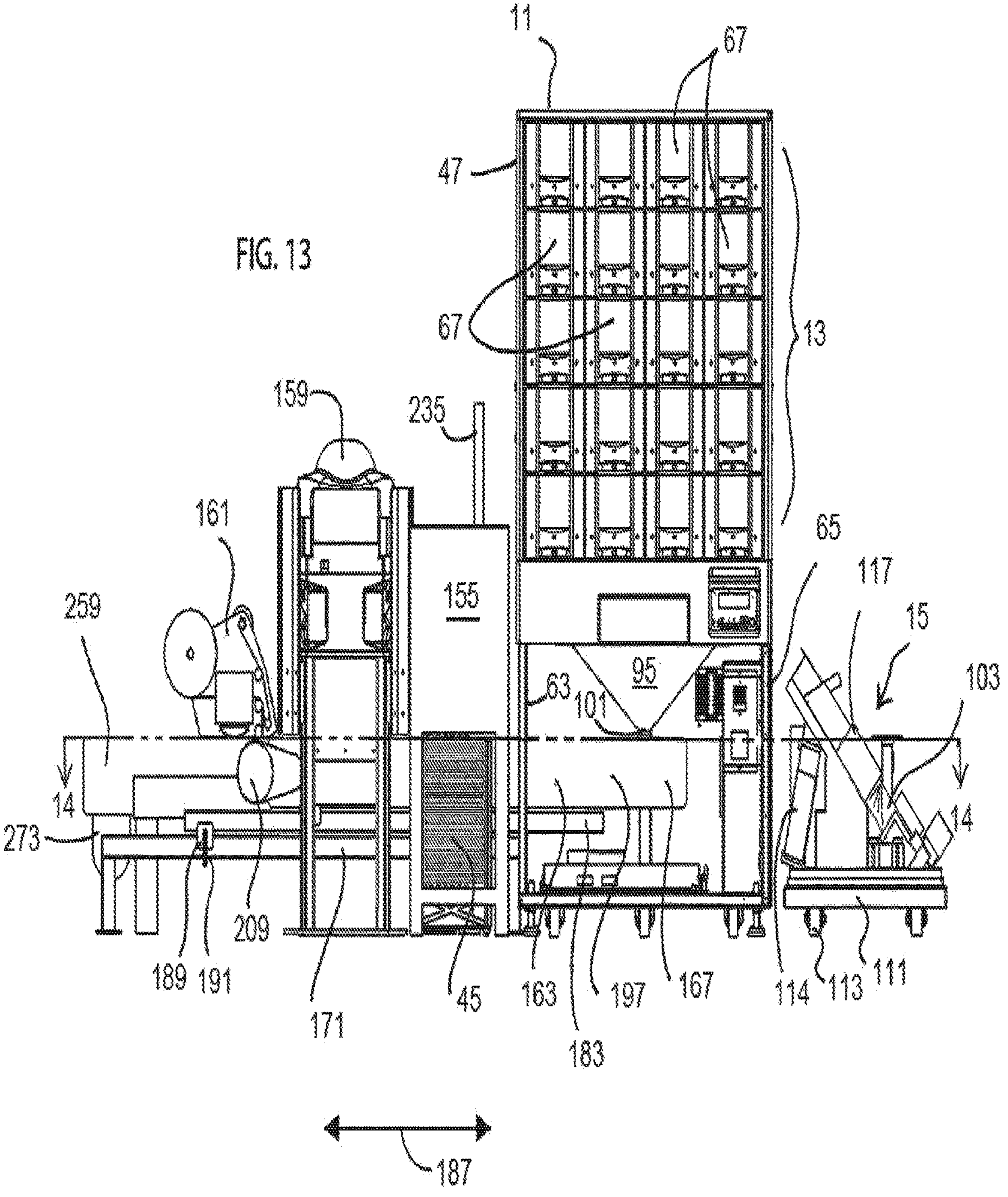
FIG. 13 is a front elevation view of the packaging system of FIG. 11.

As illustrated in FIGS. 5 and 13, after unwinding from supply roll 293 carrier web 295 may pass through an information-application device such as printer unit 307. Printer unit 307 may print information (not shown) on closure 151 at a position visible to a patient. The data and instructions used by printer unit 307 to print the information on closure 151 may be from the file for the blister package 45 stored directly or indirectly by controller 12. The printed information may include any information relevant to blister package 45 and medicaments 19 therein. The printed information may be patient specific and may include the patient name, identification of each cell 133 or the cell 133 contents, instructions for taking each medicament 19 (e.g., date and time of day the medicament is to be taken), medicament information (e.g., medicament strength and type, medicament appearance information, quantity, lot number, and expiration date), and a machine-readable code, such as a barcode. The information may include instructions for the sequence in which each cell 133 is to be accessed for purposes of taking the medicaments in blister package 45 in the correct sequence. The printed information need not be patient specific information and may include information, for example, relevant to a unit dose package not intended for any specific patient at the point of packaging by packaging system 10. Such information applied by printer unit 307 may be used in place of or in addition to information 237 that could be applied by information-application unit 155.

Closure 151 separates from carrier web 295 after traveling over idler roller 297 and between pressure roller 309 and top side 139 of blister package 45. Pressure roller 309 applies a force pushing closure 151 onto top side 139 of blister package 45. Adhesive on closure 151 side facing top side 139 of blister package 45 joins closure 151 to blister package 45, thereby sealing blister package 45. After sealing, each blister package 45 is considered to be complete and the finished package 45 is ready for delivery to the patient or for any other purpose such as providing an inventory of medicaments 19.

Further movement of belt 271 in the direction of arrow 275 causes holder (e.g., holder 247) in which blister package 45 is nested to tip as such holder passes over roller 269. Tipping of the holder (e.g., holder 247) causes the sealed blister package 45 to fall off of blister package conveyor 157. The sealed blister package 45 may fall into a tote or other container (not shown) completing the packaging process provided by the example of the blister package packaging unit 17.

Figure 23:
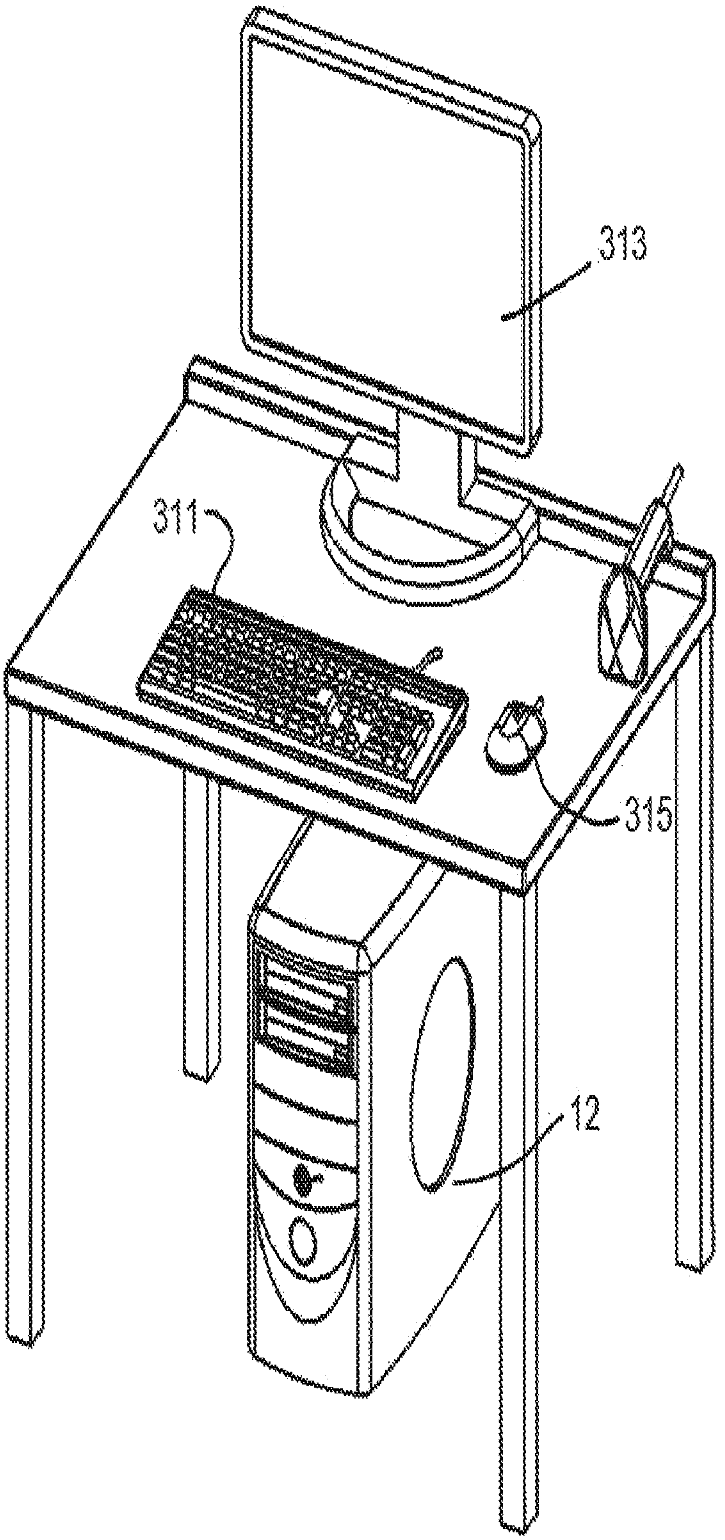
FIG. 23 illustrates an exemplary user interface with packaging system 10.

Referring now to FIGS. 1-23, overall operation of the example of packaging system 10 will now be described. In operation, the mode in which packaging system 10 is to operate may first be determined. Controller 12 may be set to the desired packaging mode through an appropriate user interface such as a keyboard 311, touch screen video display 313, mouse 315 or the like in data-transmission relationship with controller 12 (FIG. 23). In the example, controller 12 may be set to either a first mode for pouch 33 packaging or to a second mode for blister package 45 packaging. Further or different modes of packaging may be provided with other embodiments of packaging system 10. For example, packaging system 10 could be configured to function with packaging units other than pouch packaging unit 15 or blister package packaging unit 17 to thereby package medicaments 19 in other types of packages.

A record of medicament 19 type and quantity within each storage and dispensing unit 69 of medicament dispensing unit 13 may reside in memory of controller 12. Instructions and data for packaging of medicaments 19 in the selected packaging mode may be stored in a separate file residing in a database in memory of controller 12. Each file may contain all information necessary for dispensing and packaging of each medicament 19 as previously described. Thus, a separate file may exist for each pouch package 33 and a separate file may exist for each blister package 45. The files may be arranged by a technician or controller 12 in a "batch" of files containing all files for a given packaging run by packaging system 10. Controller 12 may cause packaging system 10 to process the files of the batch so as to serially dispense and package medicaments 19 in the sequence in which the medicaments 19 are to be taken by the patient. Such an arrangement can provide for compliance or multi-dose packaging in which the packaging itself orders the medicaments 19 in a manner which encourages patient compliance with the physician's prescription order.

Packaging other than in compliance packaging is contemplated. For example, all pouch packages 33 or blister packages 45 in a particular batch of files could include an identical medicament 19. Such an arrangement may be desirable when a pharmacy seeks to build an inventory of like medicaments 19 or to provide unit dose packages for patients. Other packaging arrangements and combinations of packaging arrangements are contemplated for processing by packaging system 10.

When packaging system 10 is in a first mode for pouch packaging of medicaments 19, pouch packaging unit 15 may be mounted on platform 105. Pouch packaging unit 15 may be loaded with a supply roll 114 and web material 103 from supply roll 114 may be pulled from supply roll 114 and guided by rollers or other structure to printer 117 and sealer and perforation unit 119. Platform 105 with pouch packaging unit 15 thereon is slid into automatic dispensing machine 11 housing 47. Tube 121 of pouch packaging unit 15 may be aligned with guide 93 bottom opening 101 to receive medicaments 19 falling or otherwise output from medicament dispensing unit 13. Doors 63, 65 may be closed after pouch packaging unit 15 on platform 105 is slid into housing 47 to enclose and protect pouch packaging unit 15 for operation.

Access panel 61 is preferably in place on housing 47 to further enclose pouch packaging unit 15 within housing 47. Diverter 163 may be in a non-operational state with medicament conveyor 165 in a retracted position and with diverter front end 167 outside of housing 47 proximate access panel 61. Packaging system 10 is ready for operation in a first mode for the pouch packaging process.

The pouch packaging operation begins with activation of the storage and dispensing unit(s) holding medicaments 19 required to be packaged in each pouch package 33. For example, if one unit of a medicament 19 is required for a first pouch package 33, then motor 81 of storage and dispensing unit 69 holding that medicament 19 is activated to rotate rotor 79 until a single count is made by counter 84 and recorded by controller 12. Control of the storage and dispensing unit 69 activated and the count from counter 84 of that unit 69 may be a first control over the correct type and quantity of medicaments 19 dispensed for a given pouch package 33 or blister package 45. Controller 12 may adjust motor 81 speed to rotate at a slower or faster speed depending on whether one or a greater quantity of medicaments 19 are to be dispensed or output from the storage and dispensing unit 69.

Medicament 19 may fall in a path through port 82 and chute 83 and into guide 95. Medicament 19 further falls in a path from guide lower opening 101, through tube 121 and nozzle 125 and into pocket 127 formed in web material 103 by pouch packaging unit 15. Printer 117 may provide printed information 131 for the pouch package 33 adjacent pocket 127 containing medicament 19. Sealer and perforation unit 119 subsequently forms a discrete pouch package 33 in pouch package web 103.

The foregoing pouch packaging process is repeated by pouch packaging unit 15 for each pouch package 33. The lengthening pouch package web 103 with discrete pouch packages 33-43 formed therein produced by pouch packaging unit 15 may be output through port 137. The pouch packages 33 may then be collected and provided to each patient or for other purposes as required. The files associated with controller 12 are updated accordingly to indicate that each required medicament 19 has been packaged as required by the instructions associated with each file. This concludes the pouch packaging process of the first packaging mode.

When it is desired to package medicaments in a blister package 45, controller 12 may be set to the second mode through any of the user interfaces discussed above. In the example, pouch packaging unit 15 on platform 105 may be slid out and away from housing 47 of automatic dispensing machine 11. Pouch packaging unit 15 may then be transferred to cart 111. Platform 105 may then be slid back into housing 47 and doors 61, 63 closed. As stated previously, packaging system 10 may be configured so that pouch packaging unit 15 could remain in place or moved while packaging system 10 operates in a different packaging mode.

With access panel 61 first removed, diverter 163 may be moved into its extended operational position and state. Medicament conveyor 165 of diverter may be partially extended into housing by releasing latches 189, 199 and by pushing frame rails 171, 173 and slide rails 183, 185 toward guide 93 such that a carrier 211-217 on conveyor belt 271 may be located under guide 93 bottom opening 101. Such position of a carrier 211-217 under guide 93 lower opening 101 in position to receive medicaments 19 therein may be referred to as a "receiving position." Closing of latches 189, 199 locks medicament conveyor 165 in the extended position. Packaging system 10 is ready for operation in a second mode for the blister package packaging process.

In the example of packaging system 10, diverter 163 and blister package packaging unit 17 may comprise parallel lines of conveyors. Medicament conveyor 165 serves to deliver medicaments 19 from medicament dispensing unit 13 to loading station 283 and the delivery position. Blister package conveyor 157 parallel to medicament conveyor 165 receives medicaments 19 transferred to blister package 45 for packaging.

Like the pouch packaging operation, the blister package packaging operation begins with activation of the storage and dispensing unit(s) 69 holding medicaments 19 required to be packaged in each blister package 45. For example, if three different types of medicaments 19, 21, 23 are required to fill all the cells 143 of a single blister package 45, then the required quantity of the first type medicaments 19 are first output from the storage and dispensing unit 69 holding the such medicaments 19. This is accomplished once again by activating motor 81 until the required quantity of medicaments 19 are counted by counter 84 and the file associated with controller 12 is updated.

The first type of medicaments 19 may fall in the path through port 82 and chute 83 and into guide 95. Medicaments 19 further fall in a path from guide lower opening 101.

The second mode of packaging differs from the first mode of packaging because diverter 163 diverts, changes and re-directs the path of movement of the medicaments 19 so that the medicaments 19 fall into a carrier 211-222 in the receiving position under guide 93 lower opening 101 rather than fall toward pouch packaging unit 15 which had been previously removed from automatic dispensing machine 11 in the example. A record of the quantity of medicaments 19 counted by counter 84 and the carrier (e.g., carrier 211) in which the medicaments 19 were collected is made by controller 12.

Diverter motor 209 powering medicament conveyor 165 may next be activated directly or indirectly by controller 12 to advance belt 207 with carrier 211 one step in the rearward direction of arrow 275 so that the next carrier 213 is under guide bottom opening 101 in the receiving position. The second type of medicaments 21 required for blister package 45 may then be dispensed into carrier 213 in the same manner as previously described. The process is repeated for the third type of medicament 23 which may fall into further carrier 215 advanced stepwise to the receiving position under lower guide opening 101.

Imager 223 may capture an image of the medicaments 19 in carrier 211, and subsequently in the other carriers (e.g., carriers 213, 215). The image can be utilized by controller 12 to confirm that the correct quantity and type of medicaments 19 were dispensed into carrier 211, providing a second level of control over the quantity and type of medicaments 19 dispensed. Computer imagery of the physical characteristics of the medicaments 19 (i.e., shape, color, size, markings, etc.) can be utilized for the recognition. An alarm may be provided and the packaging process stopped if an error is detected as a result of the imaging.

Through repeated cycles of loading of carriers 211-222, belt 207 is advanced stepwise so that carrier 211 with the first type of medicament 19 arrives at loading station 283 in the delivery position for transfer of medicaments 19 to a blister package 45 by robotic pick-and-place unit 159. A sensor or any appropriate control may be used to stop and start motor 209 for each step.

Packaging unit 17 operation may be synchronized with diverter 163 operation by controller 12. Transport mechanism 235 arm 241 may affix a label 239 output by label printer 233 to the topmost empty blister package 45 in bin 231. Label 239 may include patient-specific information 237 (or any other type of information) to empty blister package 45. Arm 245 of blister package delivery unit 153 may next lift and deliver the labeled blister package 45 into one holder 247-255 so that cells 143 are nested into corresponding pockets 279. Since controller 12 tracks the position of each pocket 279, controller necessarily can track the position of each cell 143 in the corresponding pocket 279.

Blister package conveyor motor 273 may next be activated directly or indirectly by controller 12 to advance belt 271 with holder 247 one step in the rearward direction of arrow 275 so that holder 247 is at loading station 283 and the next holder 249 is in position to receive an empty labeled blister package 45 from transport mechanism 235 of blister package delivery unit 153. A sensor or any appropriate control may be used to stop and start motor 273 for each step.

Operation of blister package packaging unit 17 may be synchronized with medicament dispensing unit 13 and diverter 153 so that the blister package 45 in holder 247 may be the patient-specific blister package 45 for which the first through third types of medicaments 19-23 are required in this example. With both carrier 211 containing the first type of medicaments 19 and holder 247 with the blister package 45 into which the first type of medicaments 19 are to be loaded at loading station 283, transfer of such medicaments 19 can occur by means of robotic pick-and-place unit 159 in the example.

Arms 285-289 of robotic pick-and-place unit 159 may each position control head 317 and probe end 319 to grip or pick a medicament 19 by means of vacuum and move the medicament 19 into the specific cell 143 of blister package 45 into which the medicament 19 is to be loaded or placed as determined by controller 12. The medicament 19 is then dropped into the specific cell 143 by momentary stoppage of the vacuum. Video camera 321 may capture an image of medicaments in the carrier 211-222 and such image maybe be used by controller 12 to determine that the correct quantity and type of medicaments 19 are in the carrier 211-222 providing a further level of control.

When all of the first type of medicaments 19 have been transferred from carrier 211 to blister package 45, motor 209 powering medicament conveyor 165 belt 207 advances the next carrier 213 one step to loading station 283. The aforementioned loading process is repeated for the second type of medicaments 21 with the second type of medicaments 21 being loaded by robotic pick-and-place unit 159 into the specific cells 143 of blister package 45 into which such medicaments 21 are to be loaded as determined by controller 12. The foregoing process is repeated for the third type of medicaments 23 until all required medicaments 19, 21, 23 have been transferred from carriers 211, 213, 215 to blister package 45 in this example.

Once blister package 45 has been loaded, motor 273 powering blister package conveyor 157 belt 271 advances holder 211 one step to sealer unit 161. At sealer unit 161, a closure 151 which may include printed information applied to closure 151 by printer, is attached to blister package 45 creating a sealed, finished-form blister package 45. Further advancement of belt 271 causes the sealed blister package 45 to be ejected from holder 247 as previously described. This concludes the pouch packaging process of the second packaging mode according to the example.

While the principles of this invention have been described in connection with specific embodiments, it should be understood clearly that these descriptions are made only by way of example and are not intended to limit the scope of the invention.

What is claimed is:

1. A plural-mode automatic medicament packaging system comprising:

an automatic medicament dispensing unit including a plurality of medicament storage and dispensing units, the plurality of medicament storage and dispensing units residing in individual storage locations in the automatic medicament dispensing unit, the medicament storage and dispensing units dispensing medicament from the storage locations;

a pouch packaging unit which receives medicaments from the storage and dispensing units and packages the medicaments in pouch packages;

a blister package packaging unit which receives medicaments from the storage and dispensing units and packages the medicaments in blister packages, the blister package packaging unit configured to load the medicaments into one or more specific cells of a blister package;

a plural-position medicament diverter having first and second mode positions such that, in the first-mode position, individual medicaments dispensed from the storage and dispensing units are conveyed from the storage and dispensing units to the pouch packaging unit and, in the second-mode position, individual medicaments dispensed from the storage and dispensing units are conveyed from the storage and dispensing units to the blister package packaging unit;

an inspection unit configured and positioned to inspect medicaments of one of the cells of the blister packages or one of the pouch packages; and a controller operatively associated with the automatic medicament dispensing unit, the pouch packaging unit, the blister package packaging unit, the inspection unit and the diverter.

2. The packaging system of claim 1 wherein the diverter includes a medicament conveyor.

3. The packaging system of claim 2 further including at least one medicament carrier moved by the medicament conveyor between a receiving position in which the carrier receives medicaments from the automatic medicament dispensing unit and a delivery position in which the carrier delivers the medicaments to the blister package packaging unit.

4. The packaging system of claim 1 wherein the blister package packaging unit includes a blister package conveyor which conveys a blister package for a specific patient to the blister package packing unit for loading.

5. The packaging system of claim 4 wherein the blister package conveyor transports a blister package holder into which a blister package is nested by the blister package packaging unit.

6. The packaging system of claim 1 wherein the inspection unit further includes an imaging device which captures an image of the medicaments.

7. The packaging system of claim 6, wherein the imaging device is positioned to capture an image of the medicaments after dispensing.

8. The packaging system of claim 6, wherein the blister package packaging unit includes a sealer unit which seals the blister package after loading, and wherein the imaging device captures an image of the medicaments before sealing of the blister package.

9. A plural-mode automatic packaging system comprising:

an automatic dispensing unit including a plurality of storage and dispensing units, the plurality of storage and dispensing units residing in individual storage locations in the automatic dispensing unit, the storage and dispensing units dispensing items from the storage locations;

a first packaging unit which receives items from the storage and dispensing units and packages the items in first packages;

a second packaging unit which receives items from the storage and dispensing units and packages the items in second packages, the second packages differing in type from the first packages;

a plural-position item diverter having a conveyor, the diverter having first and second mode positions such that, in the first-mode position, items move from the storage and dispensing units to the first packaging unit and, in the second-mode position, items move from the storage and dispensing units to the conveyor of the diverter and the conveyor delivers the items to the second packaging unit;

an inspection unit configured and positioned to inspect items of one of the first packages or one of the second packages; and a controller operatively associated with the automatic dispensing unit, the first packaging unit, the second packaging unit and the diverter.

10. The packaging system of claim 9 further including at least one carrier moved by the conveyor between a receiving position in which the carrier receives items from the automatic dispensing unit and a delivery position in which the carrier delivers the items to the second packaging unit.

11. The packaging system of claim 9 wherein the second packaging unit includes a second conveyor which conveys a second package to the second packaging unit for loading.

12. The packaging system of claim 11 wherein the second conveyor transports a second package holder into which a second package is nested by the second packaging unit.

13. The packaging system of claim 9 wherein the inspection unit further include an imaging device which captures an image of the items.

14. The packaging system of claim 13, wherein the imaging device is positioned to capture an image of the items after dispensing.

15. The packaging system of claim 13, wherein the second packaging unit includes a sealer unit which seals the second package after loading, and wherein the imaging device captures an image of the items before sealing of the second package.

16. A plural-mode automatic medicament packaging system comprising:

an automatic medicament dispensing unit including a plurality of medicament storage and dispensing units, the plurality of medicament storage and dispensing units residing in individual storage locations in the automatic medicament dispensing unit, the storage and dispensing units dispensing medicaments from the storage locations;

a first packaging unit which receives medicaments from the medicament storage and dispensing units and packages the medicaments in first packages;

a second packaging unit which receives medicaments from the medicament storage and dispensing units and packages the medicaments in second packages, the second packages differing in type from the first packages;

a plural-position item diverter having a conveyor, the diverter having first and second mode positions such that, in the first-mode position, medicaments move from the medicament storage and dispensing units to the first packaging unit and, in the second-mode position, items move from the medicament storage and dispensing units to the conveyor of the diverter and the conveyor delivers the medicaments to the second packaging unit;

an inspection unit configured and positioned to inspect items of one of the first packages or one of the second packages; and a controller operatively associated with the automatic medicament dispensing unit, the first packaging unit, the second packaging unit and the diverter.

17. The packaging system of claim 16 further including at least one medicament carrier moved by the conveyor between a receiving position in which the carrier receives medicaments from the automatic medicament dispensing unit and a delivery position in which the carrier delivers the medicaments to the second packaging unit.

18. The packaging system of claim 16 wherein the second packaging unit includes a second conveyor which conveys a second package for a specific patient to the second packaging unit for loading.

19. The packaging system of claim 16 wherein the inspection unit includes an imaging device which captures an image of the medicaments after dispensing.

20. The packaging system of claim 16, wherein the first packaging unit comprises a pouch packaging unit, and the second packaging unit comprises a blister package packaging unit.

* * * * *